US007236634B2

(12) United States Patent
Miyakoshi et al.

(10) Patent No.: US 7,236,634 B2
(45) Date of Patent: Jun. 26, 2007

(54) IMAGE ENCODING OF MOVING PICTURES

(75) Inventors: Junichi Miyakoshi, Kanazawa (JP);
Masayuki Miyama, Kanazawa (JP);
Masahiko Yoshimoto, Kanazawa (JP);
Hideo Hashimoto, Kanazawa (JP);
Kousuke Imamura, Kanazawa (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 788 days.

(21) Appl. No.: 10/703,547

(22) Filed: Nov. 10, 2003

(65) Prior Publication Data

US 2004/0151392 A1 Aug. 5, 2004

(30) Foreign Application Priority Data

Feb. 4, 2003 (JP) ............................. 2003-027395

(51) Int. Cl.
*G06K 9/36* (2006.01)
(52) U.S. Cl. ............ 382/236; 382/238; 382/250; 382/253; 348/402.1; 348/413.1; 348/415.1; 348/417.1; 375/240.12; 375/240.16; 375/240.17
(58) Field of Classification Search ............ 382/232, 382/236, 237, 238, 239, 240, 245, 246, 247, 382/248, 249, 250, 251, 252, 253; 358/426.02, 358/426.11; 348/402.1, 407.1, 409.1, 412.1, 348/415.1, 416.1, 417.1, 418.1; 375/240.01, 375/240.02, 240.16, 240.17
See application file for complete search history.

(56) References Cited

U.S. PATENT DOCUMENTS 6,996,180 B2* 2/2006 Kim et al. ............ 375/240.16

7,177,359 B2* 2/2007 Song et al. ............ 375/240.16
2003/0072373 A1* 4/2003 Sun ........................ 375/240.16
2003/0072374 A1* 4/2003 Sohm ..................... 375/240.16

FOREIGN PATENT DOCUMENTS

JP 8-79760 3/1996
JP 2000-102016 4/2000

OTHER PUBLICATIONS

H. Nakayama et al., "An MPEG-4 Video LSI with and Error-Resilient Codec Core based on a Fast Motion Estimation Algorithm.", Proc. ISSCC 2002/Session 22/Multimedia Signal Processing/22.2 2002 IEEE International Solid-State Circuits Conference 0-7803-7335-9, pp. 10.
M. Takabayashi, et al. "A Fast Motion Vector Detection based on Gradient Method." The Institute of Electronics, Information and Communication Engineers, Technical Report of IEICE, IE2001-74, Sep. 2001. pp. 1-6.

* cited by examiner

*Primary Examiner*—Matthew C. Bella
*Assistant Examiner*—Ali Bayat
(74) *Attorney, Agent, or Firm*—McDermott, Will & Emery LLP

(57) ABSTRACT

In an encoding method of moving pictures which generates a predictive picture for a current picture based on a reference picture and a motion vector, a macroblock is divided into subblocks. In each of the plurality of subblocks, an initial value of the motion vector is set and an evaluated value E on a difference between the current picture and the reference picture is calculated along a steepest descent direction to determine the minimum value. Then, the smallest evaluated value is selected among the minimum values obtained on the plurality of subblocks to determine the motion vector based on the pixel position of the smallest value.

9 Claims, 32 Drawing Sheets

IMAGE ENCODING OF MOVING PICTURES

BACKGROUND OF THE INVENTION

1. Field of the Invention

The present invention relates to image coding of moving pictures.

2. Description of Prior Art

Recently, a mobile instrument such as mobile phone is widely used as a terminal unit for transmitting information, and it is possible to talk and send a moving picture to anyone whenever and wherever. Therefore it is desirable to run a mobile instrument for a long time with a limited cell capacity for driving the mobile instrument.

An MPEG (Motion Picture Experts Group) encoder is used in a mobile instrument to compress moving pictures. A motion compensator in an MPEG encoder estimates a motion between pictures for predictive coding. The position of a macroblock which matches best with a reference picture is detected in a current picture, and the picture at the position is used as a predictive picture. Then, the position is sent for encoding as motion vector information, and the picture data is encoded by using the motion vector to compensate the motion. Full search method is used as a block matching technique to determine the motion vector. In an MPEG encoder which uses the full search method, a motion compensator performs a large part of the computation. Therefore, it is necessary to provide a motion compensator of lower consumption power.

Full search method used for block matching is a technique which performs search in all cases. In this method, a value to be evaluated, for example, a sum of distortions in the block (a sum of square difference) on a macroblock (TB: a template block of 16*16 pixels) in a current picture is calculated on every macroblock in a search range (SW: search window) of a reference picture, and a macroblock having the minimum evaluated value is detected as motion vector ($V_x$, $V_y$). If the search range is ±16*±16, the computation is performed on vectors of $32^2$ Because the computation is performed on all the vectors, the quality of the image obtained by full search method is very good, but the required computation power is very large.

Techniques such as greedy search method (for example, H. Nakayama et al., "An MPEG-4 Video LSI with an Error-Resilient Codec Core based on a Fast Motion Estimation Algorithm", Proc. ISSCC 2002, 22-2, 2002) and gradient descent search method (for example, M. Takabayashi et al., "A Fast Motion Vector Detection based on Gradient Method", Technical Report of IEICE, IE2001-74, September 2001) can decrease the computation power very much than that of the full search method. In greedy search method, an initial vector is calculated first wherein a vector having the smallest evaluated value of, for example, a sum of square difference among top, upper right and left vectors is selected as the initial vector. Next, block matching of four neighboring pixels is performed in the precision of a half-pel, and the macroblock is moved at the precision of half-pel in the direction of a minimum. This process is repeated, and it is stopped when the macroblock is moved to a position having the minimum value.

The gradient descent method is a kind of steepest descent method. Differential coefficients of an evaluated value are calculated at a search point, and the evaluated value is calculated in the direction of the steepest downward gradient derived from the differential coefficients. A vector having the minimum evaluated value is determined as a motion vector. In the calculation, an evaluated value of an initial motion vector is calculated. Next, the differential coefficients are calculated, and the evaluated value is calculated in the direction derived from the differential coefficients to determine the minimum in the one-dimensional search. In this method, the differential coefficients are calculated, and the evaluated value is calculated only in the direction derived from the differential coefficients in contrast to the above-mentioned full search method. Then, the required computation power is decreased in the gradient descent method.

Lower computation power and higher quality of image are desirable in the calculation of motion prediction. The above-mentioned gradient descent search method has a disadvantage that it is liable to lead to a local solution, depending very much on the initial value, and in such a case, the optimum motion vector cannot be detected, and image quality is deteriorated. Therefore, it is desirable that the computation power is decreased without deteriorating image quality.

SUMMARY OF THE INVENTION

An object of the invention is to provide image coding of moving pictures having lower computation power without deteriorating image quality.

In an encoding method according the present invention for encoding moving pictures wherein a predictive picture for a current picture is generated based on a reference picture and a motion vector, a macroblock is divided into subblocks smaller than the macroblock. Then, for each subblock, an initial value of the motion vector is set, and an evaluated value E on a difference between the current picture and the reference picture, $$E = \sum_{i,j}(TB_{i,j} - SW_{i+Vx,j+Vy})^2,$$

wherein $TB_{i,j}$ represents pixel value at pixel position (i, j) in a template block of the current picture, $SW_{i,j}$ represents pixel value at pixel position (i, j) in a search window of the predictive picture, and $V_x$ and $V_y$ represent the motion vector in x and y directions, and differential coefficients thereof in x and y directions, $\partial E/\partial x$ and $\partial E/\partial y$.

Then, the value E is evaluated at a plurality of pixel positions in a direction having the steepest downward gradient derived from the differential coefficients to determine the minimum evaluated value. Then, each of the plurality of subblocks is expanded to a macroblock by supplementing defective portions, and the smallest value is determined among the minimum evaluated values obtained on the subblocks to determine the motion vector based on the pixel position of the smallest value. The above-mentioned subblock search may be combined with known macroblock search. An image encoder according to the invention calculates the motion compensation of the above-mentioned image encoding.

An advantage of the present invention is that the computation power is decreased while image quality is not so deteriorated in motion compensation in the encoding of moving pictures.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
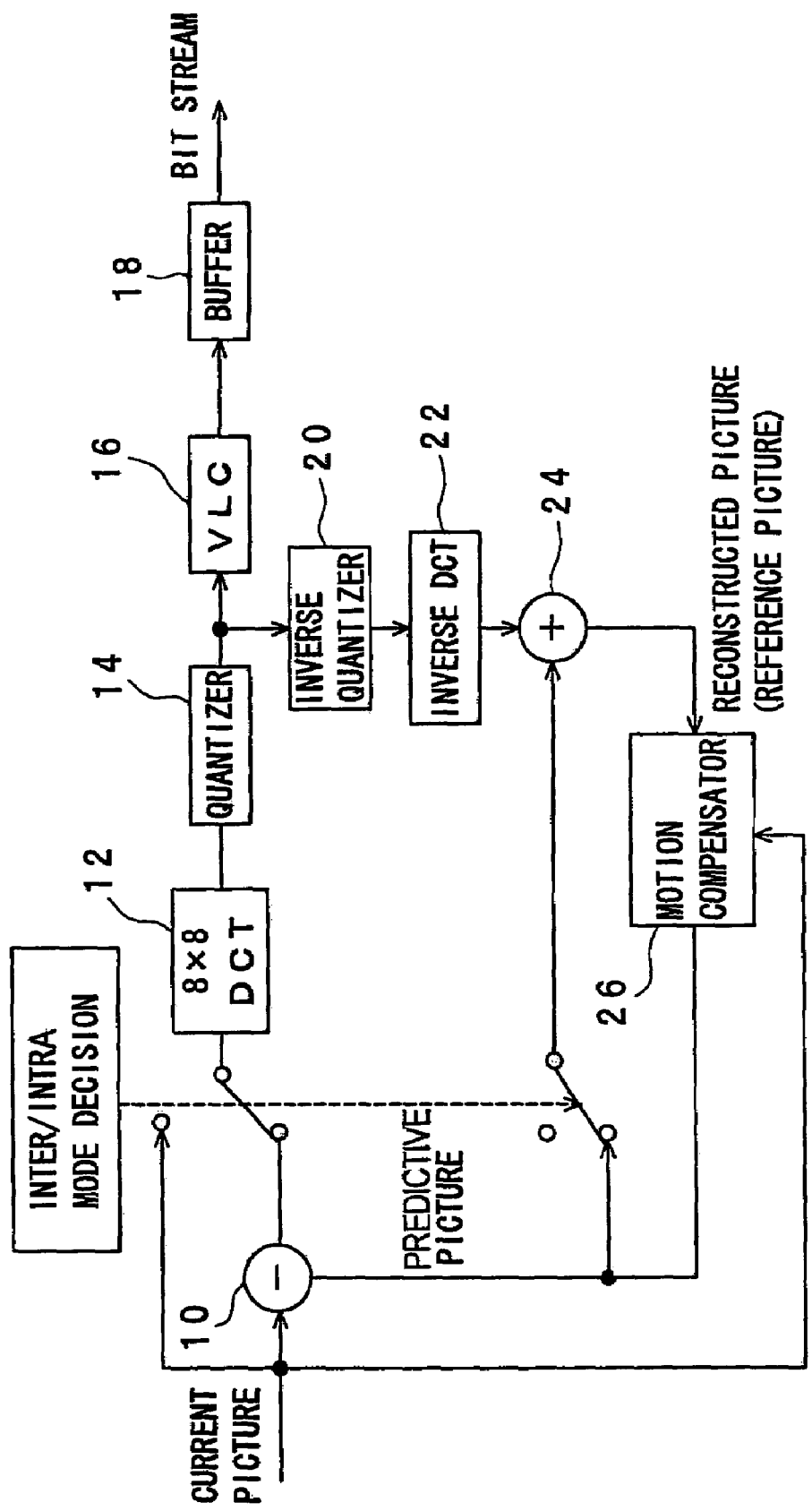
FIG. 1 is a block diagram of an image encoder.

Referring now to the drawings, wherein like reference characters designate like or corresponding parts throughout the several views, FIG. 1 shows an internal structure of a standard image encoder which performs image encoding or the like used for MPEG encoding. Picture data of the current picture to be encoded and frame information are inputted. In the image encoder, a subtractor 10 obtains a difference between a current picture and a predicted picture, a discrete cosine transform (DCT) circuit 12 performs discrete cosine transform of the difference, and quantizer 14 quantizes the discrete cosine transform data. Then, an entropy encoder 16 encodes the quantized data. The compressed data are outputted through a buffer 18 as a bit stream. On the other hand, the quantized data are subjected to inverse quantization by an inverse quantizer 20 and are decoded next by an inverse DCT circuit 22. Then, an adder 24 adds the decoded data to a predictive picture to reconstruct the original data. A motion compensator 26 determines a motion vector to predict the current picture from the reference picture to make a predictive picture.

The motion compensator 26 can be used for the prior art gradient descent search method besides subblock search to be explained below. When the motion compensator 26 determines a motion vector V in the prior art gradient descent search method, an initial value of the motion vector is calculated first to determine a search point. A value E evaluated in the search is, for example, a sum of distortions in the block (a sum of square difference). The evaluated value E at a search point is expressed as follows:

$$E = \sum_{i=0}^{15} \sum_{j=0}^{15} (TB_{i,j} - SW_{i+Vx, j+Vy})^2,$$

wherein i and j are integers of 0 to 15 to represent a pixel position in a template block (a picture to be encoded) in a current frame, $TB_{i,j}$ is a pixel value at pixel position (i, j) in the template block, and $SW_{i,j}$ is a pixel value at the pixel position (i, j) in a search window in a predictive picture (such as a picture in the previous frame). Differential coefficients (gradient) of the evaluated value E are calculated at the initial search point. Then, the value E is calculated in a direction having the steepest gradient derived from the differential coefficients, and the minimum of the evaluated value is determined in the one-dimensional search.

Previously, the search is performed in the unit of macroblock (16*16=256 pixels) used for block matching. However, if the picture has a smaller size, a fine structure (or high spatial frequency components), or the like, the optimum motion vector may not be determined because the size of macroblock is too large, and the image quality is deteriorated in such a case. Then, the inventors perform the search in the unit of subblock having a smaller size than the macroblock and finds that image quality is improved. In an example explained below, a macroblock of 16*16 pixels is divided into four smaller blocks of 8*8 pixels, and the smaller block is used as the subblock. However, it is to be noted that the term of subblock generally represents a block having a size smaller than the macroblock, or it is not limited to a block having the size of a fourth of the macroblock.

Figure 2:
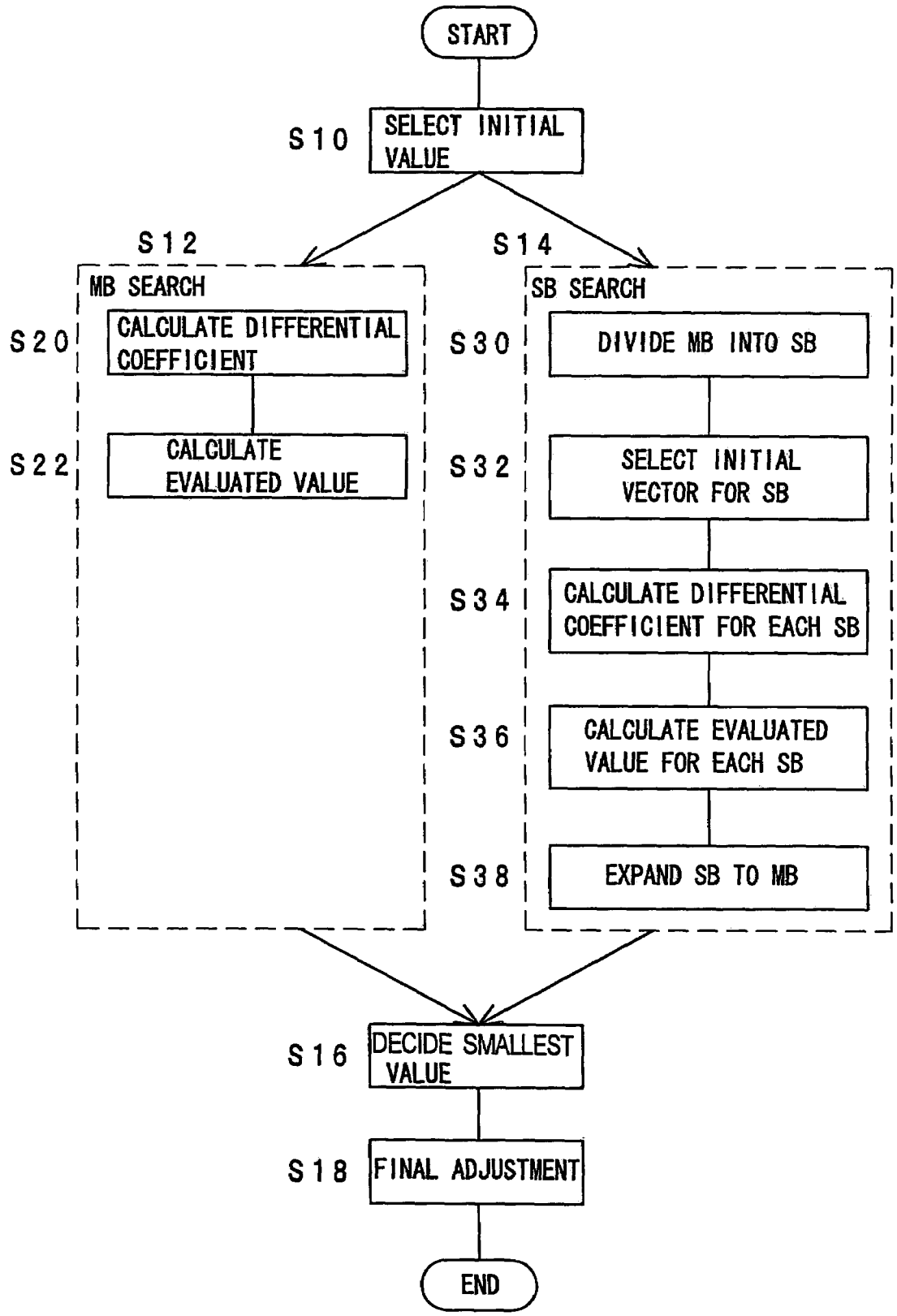
FIG. 2 is a flowchart of an algorithm of gradation process introducing subblock search.

FIG. 2 shows an algorithm of a gradation method which introduces subblock search. When the search on motion vector is performed on a macroblock in a picture, an initial motion vector is set (S10). Then, macroblock search is performed (S12). The "macroblock search" is the abovementioned search in the unit of the macroblock. Further, subblock search is performed in parallel to the macroblock search (S14). The "subblock search" represents a search in the unit of subblock having a smaller size than the macroblock. Next, the smallest value is determined among the minima of the evaluated values calculated in the searches (S16). That is, five evaluated values are calculated in the macroblock search on the macroblock and in the subblock search on the four subblocks, and an optimum vector is selected as a motion vector based on the smallest value. Finally, final adjustment is performed to determine the motion vector in the precision of half-pel (S18), wherein a search is performed based on the above result in the precision of half-pel on the surrounding eight or four points.

In the above-mentioned flow, the macroblock search and the subblock search are performed in parallel, so that a time for the search can be shortened. Alternatively, after the macroblock search is performed, the subblock search is performed based on the result thereof, so that the motion vector can be determined more precisely.

In the macroblock search (S12), differential coefficients of the evaluated value E, that is, $$\frac{\partial E}{\partial x} = \sum_{i=0}^{15} \sum_{j=0}^{15} (TB_{i,j} - SW_{i+Vx,j+Vy})(SW_{i+1+Vx,j+Vy} - SW_{i-1+Vx,j+Vy})$$

and $$\frac{\partial E}{\partial y} = \sum_{i=0}^{15} \sum_{j=0}^{15} (TB_{i,j} - SW_{i+Vx,j+Vy})(SW_{i+Vx,j+1+Vy} - SW_{i+Vx,j-1+Vy}),$$

are calculated (S20). Then, the value E is calculated in the direction derived by the differential coefficients to determine the minimum of the value E in the one-dimensional search (S22).

Figure 3:
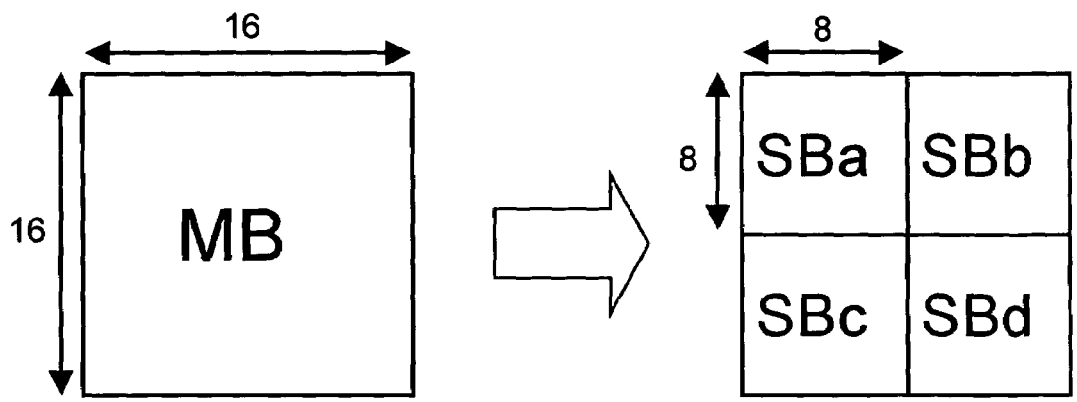
FIG. 3 is a diagram on division into subblocks.

In the subblock search (S14), the macroblock (16*16 pixels) is divided into subblocks (8*8 pixels) (S30). As shown in FIG. 3, a macroblock (MB) is divided into four subblocks (SBa, SBb, SBc and SBd). Next, an initial vector of a subblock is set (S32). It is to be noted that when the macroblock search (S12) and the subblock search (S14) are performed in parallel to each other, the initial vector for the subblock is set to the same one for the macroblock, while when the subblock search is performed after the macroblock search, the initial vector for the subblock search is set to the optimum vector for the macroblock.

Figure 4:
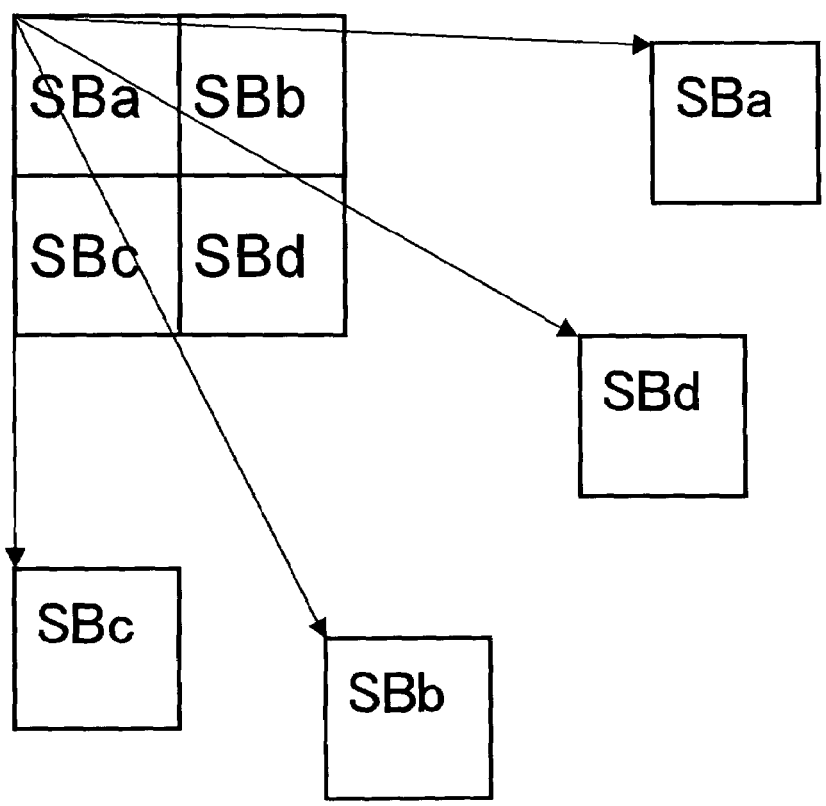
FIG. 4 is a diagram for explaining independent search on subblocks.

Next, as shown in FIG. 4, differential coefficients $$\frac{\partial E}{\partial x} = \sum_{i=0}^{7} \sum_{j=0}^{7} (TB_{i,j} - SW_{i+Vx,j+Vy})(SW_{i+1+Vx,j+Vy} - SW_{i-1+Vx,j+Vy})$$

and $$\frac{\partial E}{\partial y} = \sum_{i=0}^{7} \sum_{j=0}^{7} (TB_{i,j} - SW_{i+Vx,j+Vy})(SW_{i+Vx,j+1+Vy} - SW_{i+Vx,j-1+Vy}),$$

of a value E, $$E = \sum_{i=0}^{7} \sum_{j=0}^{7} (TB_{i,j} - SW_{i+Vx,j+Vy})^2,$$

are calculated for each subblock independently of each other (S 34), similarly to the macroblock search. Then, the motion vector ($V_x$, $V_y$) is searched in a direction derived as $$\tan \theta = (\partial E/\partial x)/(\partial E/\partial y)$$

Figure 5:
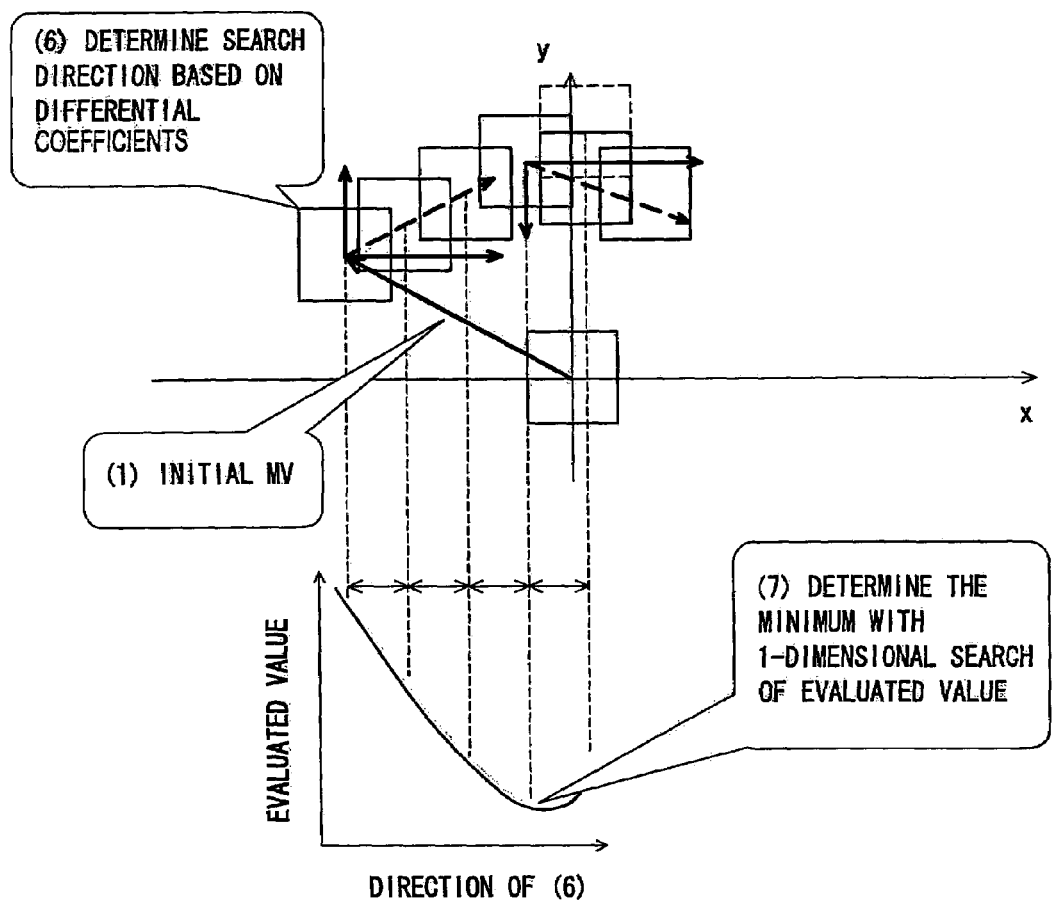
FIG. 5 is a diagram for explaining a situation of one-dimensional search.

(S36). As will be explained layer, the search direction is rounded. In order to decrease the required computation power for the search, it is desirable that a range of search point (motion vector) is narrow. Then, the search range is set to ±16*±16 pixels based on a study on the relationship of image quality with the range of search point. The value E is evaluated in the search direction, and one-dimensional search is performed, as shown in FIG. 5, to determine the minimum of the evaluated value E. In the one-dimensional search, the value E is calculated at a predetermined step width such as one pixel in the search direction, and the search is stopped when the evaluated value starts to increase. The differential coefficients of the evaluated value are calculated at the pixel positioned by one before the pixel at which the search is stopped, and search direction θ' derived from the differential coefficients is calculated. If θ' is not the same as θ, the one-dimensional search is performed in the direction of θ. If θ' is the same as θ, the one-dimensional search is stopped. When the macroblock search (S12) is performed in parallel to the subblock search (S14), the macroblock is also searched to find an optimum vector.

Figure 6:
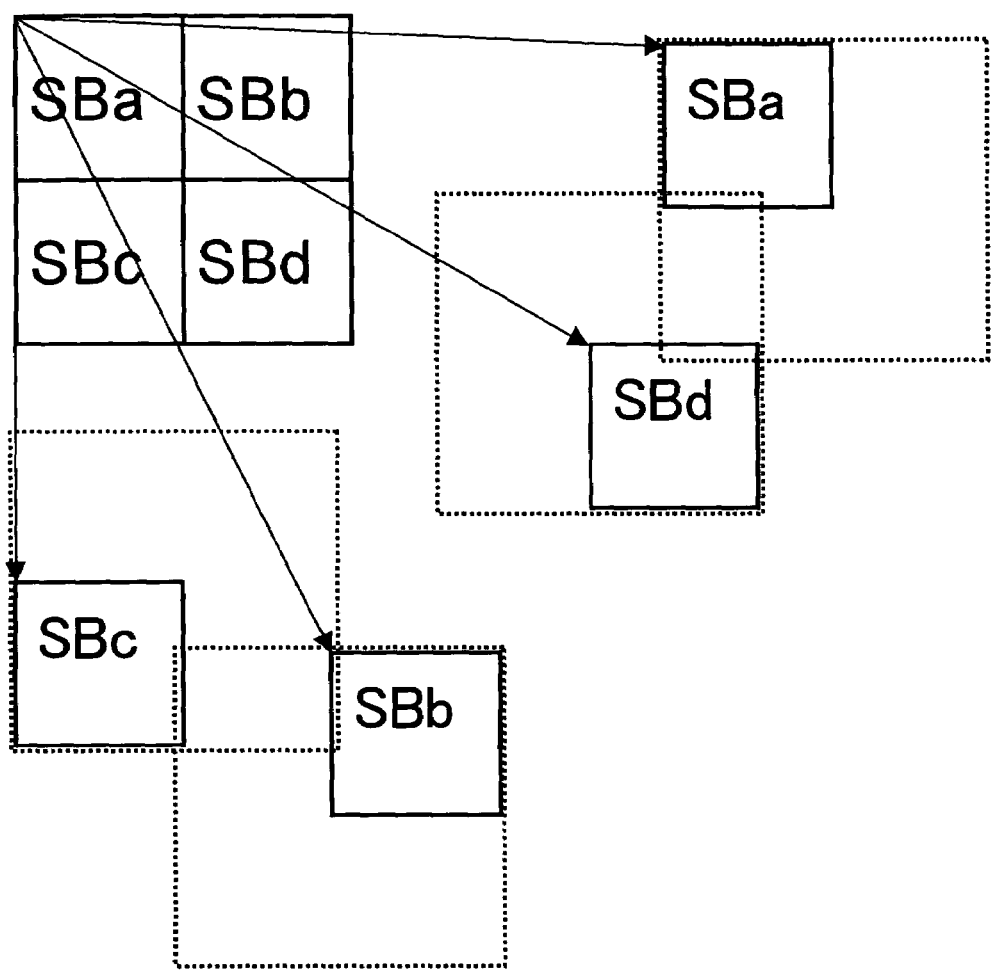
FIG. 6 is a diagram on extension of a subblock to a macroblock.

Next, a subblock is expanded to a macroblock (S38). As shown in FIG. 6, a subblock is expanded to supplement lacking portions, to form a macroblock. For example, the subblock SBa is a subblock at the upper left portion in a macroblock, and it is expanded in lacking portions in the upper right, lower left and lower right portions.

Figure 7:
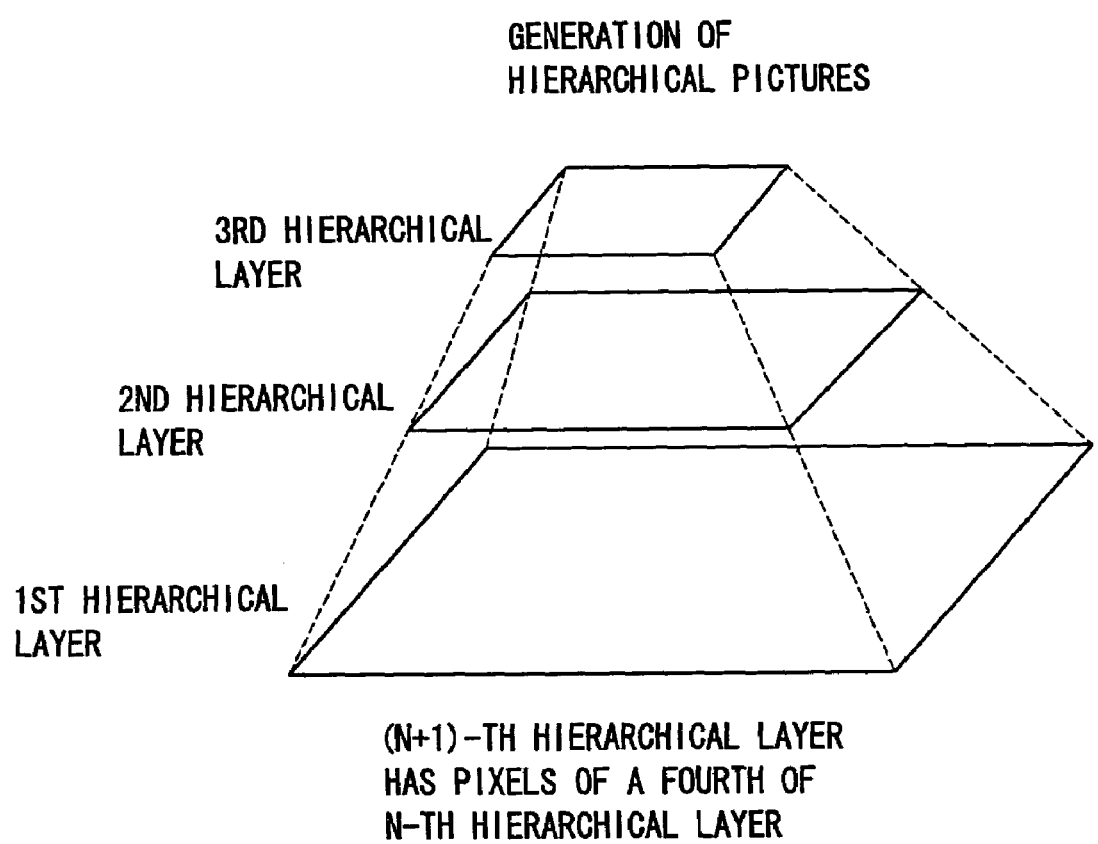
FIG. 7 is a diagram for explaining generation of layer images.
Figure 8:
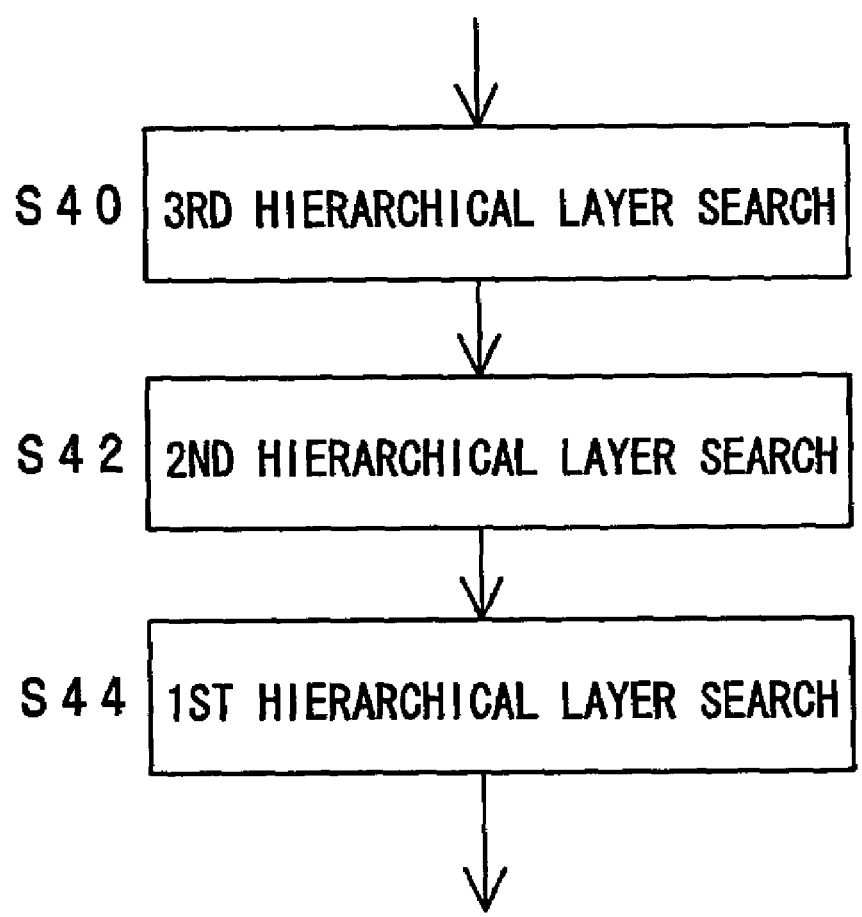
FIG. 8 is a flowchart of layer search process.

In order to avoid a local solution, the calculations of the differential coefficients and the evaluated value are performed in n hierarchical layers in both subblock and macroblock searches. As shown in FIG. 7, hierarchical layer pictures are generated by ¼ sampling (thinning) so as to make the computation simple. A picture of (n+1)-th hierarchical layer is a picture obtained by thinning the picture of n-th hierarchical layer by ½, and it consists of pixels of a fourth of that of the picture of the n-th hierarchical layer. In the subblock search, a picture of the first hierarchical layer consists of 8*8 pixels, and in the macroblock search, a picture of the first hierarchical layer consists of 16*16 pixels. Motion vector is searched successively from the top hierarchical layer. For example, when pictures of three hierarchical layers are used, as shown in FIG. 8, the search is performed in the order of third hierarchical layer search (S40), second hierarchical layer search (S42) and first hierarchical layer search (S44). The search range is ±4*±4 in the third hierarchical layer, ±8*±8 in the second hierarchical layer, and ±16*±16 in the first hierarchical layer. The calculations of the differential coefficients and the evaluated value are performed in each hierarchical layer, and the motion vector is determined at the lowest hierarchical layer (first layer) wherein no thinning of pixels is performed. Because the smoothing effect is more advantageous in the top hierarchical layer than in the bottom hierarchical layer, the probability that a local solution occurs is decreased, and the image quality is improved.

In the detection of the smallest evaluated value (S16), the minimum values E of five types of vectors are all calculated in the macroblock search and in the four subblock searches (and expansion to macroblock). Then, an optimum vector is selected as the motion vector based on the smallest among the minimum values. When only the subblock search is performed, the best vector having the smallest value is selected in the vectors obtained on the four subblocks.

Figure 9:
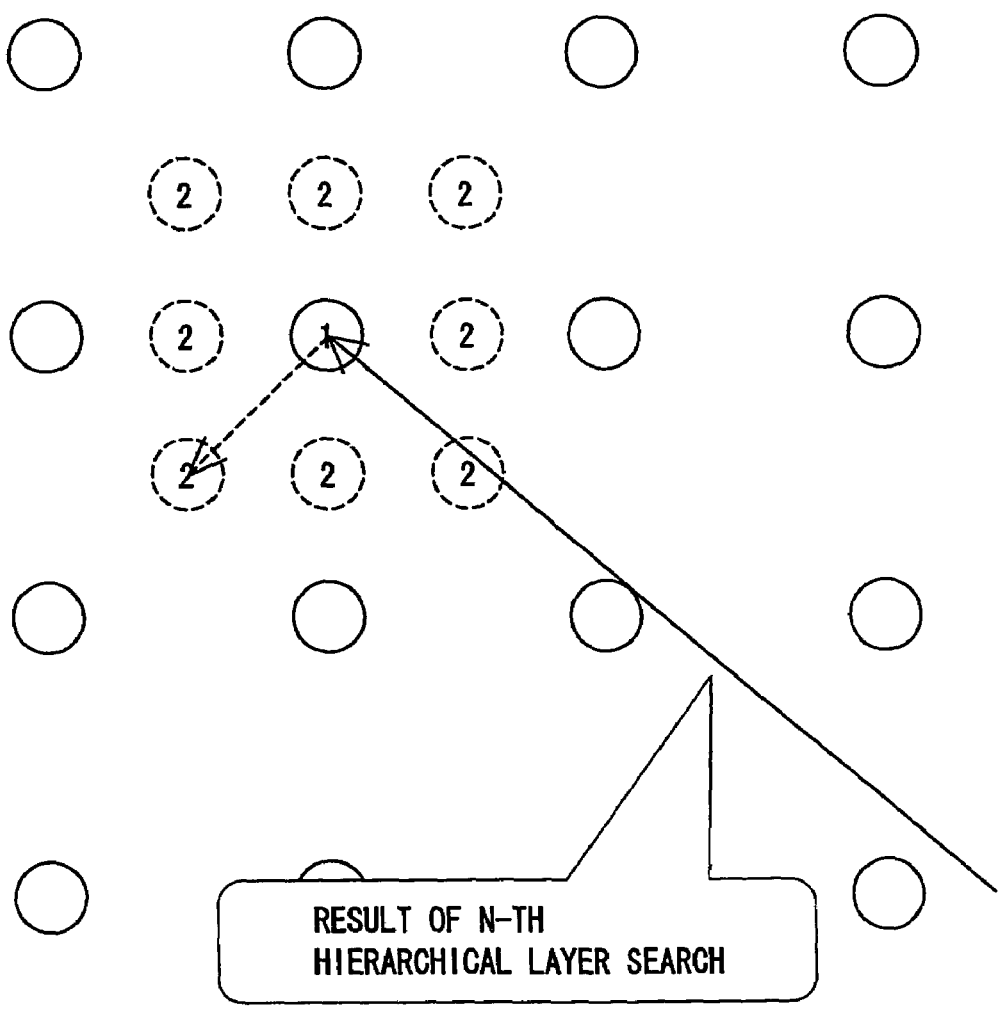
FIG. 9 is a diagram for explaining final adjustment.

Finally, in the final adjustment (S18), based on the result obtained in the precision of full-pel, block matching is further performed with eight or four neighboring pixels in the precision of half-pel, to adjust the motion vector. In FIG. 9, a circle in solid line denotes a ful-pel, and a circle in dashed line denotes a half-pel located between ful-pels. In the case of four neighbors, the value E at a half-pel is obtained as an average of the values at a first pixel under interest and at a second pixel at an opposite side to the first pixel, and in the case of eight neighbors, it is obtained as an average of the values E at four neighboring pixels including the pixel under interest. The optimum motion vector is searched in the precision of half-pel among the eight or four neighbors around the motion vector (solid line) obtained by the gradient descent search method. The image quality can be improved further by repeating the final adjustment. Because the motion vector is obtained in the precision of half-pel more precisely, the image quality is improved.

In order to make a very large scale integrated circuit (VLSI) of the motion compensator 24, following points are considered on the calculation.

(a) The differential coefficients and the evaluated value are calculated in the precision of full-pel.

(b) In the calculation of the differential coefficients, the search direction is rounded in a direction of eight neighbors.

(c) The search step width is always set to one pixel, irrespectively of the values of the differential coefficients.

(d) In the generation of hierarchical layer pictures, ¼ sampling is used, as mentioned above.

(e) The pixels used for calculating the differential coefficients include the pixels in a macroblock and pixels surrounding the macroblock. However, for the easiness of making a hardware circuit, the end pixels in the macroblock are substituted for the surrounding pixels.

Figure 10:
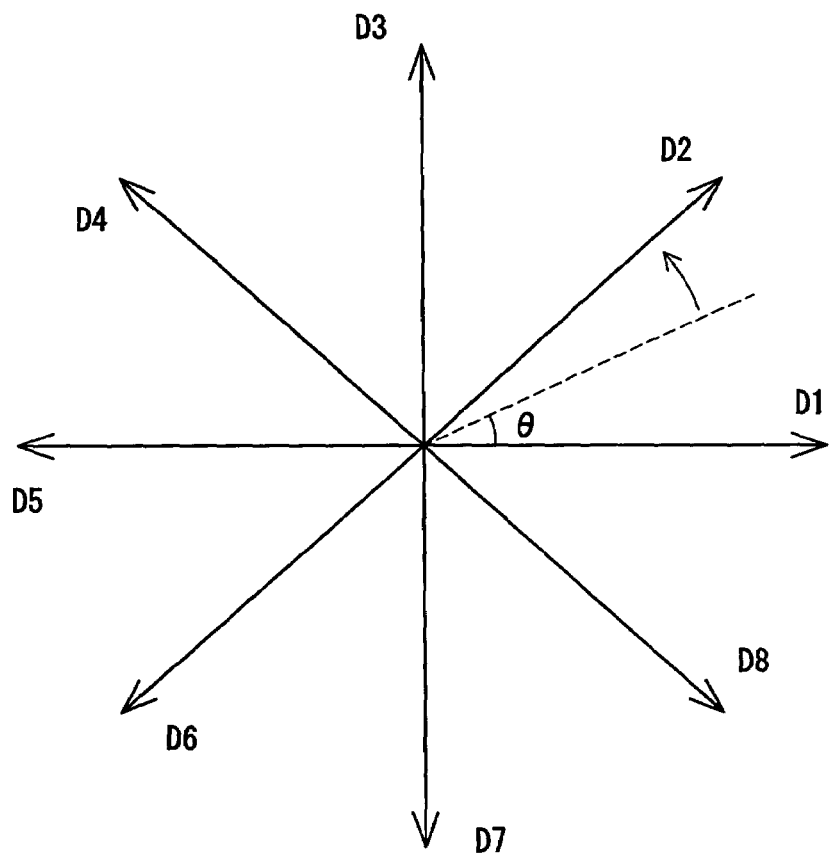
FIG. 10 is a diagram for explaining rounding at four neighbors and at eight neighbors.

Finally, the rounding of the search direction to eight directions D1 to D8 is explained with reference to FIG. 10. The eight directions are up, down, left and right directions and for oblique directions between them. When the search direction is determined, it is rounded to one of the above-mentioned eight directions. The step width of the search is one pixel. In concrete, the rounding is performed as follows wherein dx and dy are x and y differential, respectively.

(a) When tan θ exists in the first quadrant ($0° \leq θ \leq 90°$, or dx>0 and dy>0),
if |dx|>2*|dy|, then the search direction is rounded to D1,
if 2*|dx|<|dy|, then the search direction is rounded to D3,
otherwise the search direction is rounded to D2.

(b) When tan θ exists in the second quadrant ($90° \leq θ \leq 180°$, or dx<0 and dy>0),
if |dx|>2*|dy|, then the search direction is rounded to D5,
if 2*|dx|<|dy|, then the search direction is rounded to D3,
otherwise the search direction is rounded to D4.

(c) When tan θ exists in the third quadrant ($180° \leq θ \leq 270°$, or dx<0 and dy<0),
if |dx|>2*|dy|, then the search direction is rounded to D5,
if 2*|dx|<|dy|, then the search direction is rounded to D7,
otherwise the search direction is rounded to D6.

(d) When tan θ exists in the fourth quadrant ($270° \leq θ \leq 360°$, or dx>0 and dy<0),
if |dx|>2*|dy|, then the search direction is rounded to D1,
if 2*|dx|<|dy|, then the search direction is rounded to D7,
otherwise the search direction is rounded to D 8.

Therefore, for example, at θ of 31°, the search direction is rounded to direction D2.

Figure 11:
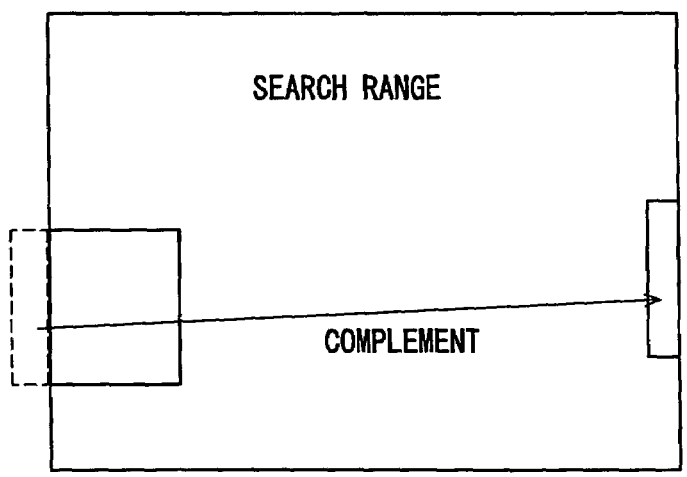
FIG. 11 is a diagram for explaining boundary search.

Boundary search is used when a subblock or a macroblock extends over a boundary of a reference picture. In the "boundary search", pixels at the top, bottom, left or right boundary of a reference picture are substituted by pixels at the opposite side. In a case schematically shown in FIG. 11, if a left side of a block of search range extends over the left boundary, the search is usually stopped at the left end. However, in the boundary search, the pixels overrunning the left boundary are complemented by the pixels at the right end of the search range to continue the search. The boundary search has a large advantage when an entire picture is moving slowly to the top, bottom, left or right direction. A similar advantage is obtained by bi-directional prediction, but the required computation power therefor becomes twice.

Finally, the final adjustment is performed in the precision of half-pel on the result obtained in the precision of full-pel (S40). On the result of the n-hierarchical layer search, evaluated values E are calculated on all the eight or four neighbors surrounding the block. Then, an error of the motion vector is adjusted in the unit of half-pixel.

Next, results of simulation are presented. Tables 1 to 5 show simulation results on five QCIF pictures (176*144 pixels), while tables 6 to 10 show simulation results on five CIF pictures (352*288 pixels). The search range is ±16*±16 pixels. In the presentation of the type of search in the tables, "FS" denotes full search method, "MSE" means an average of a sum of squared differences is used as the evaluated value E, "MAE" denotes a sum of absolute values of difference is used as the evaluated value E, and "¼MAE" means that a sum of absolute values of difference on data subjected to ¼ sub-sampling is used as the evaluated value E. "¼ sub-sampling" means a sampling every two pixels in the vertical and horizontal directions, wherein the number of vectors as candidates becomes a fourth. "GRS" denotes greedy search method, wherein H2 and H1 denotes two hierarchical layers and one hierarchical layer respectively. "GDS" denotes prior art gradation descent method, while "GDS+SB" denotes a gradation descent method using subblocks of the invention. In (Hn,p:q:r), Hn shows that the hierarchical layers in the search are n hierarchical layers, p:q:r denotes search times in the third, second and first hierarchical layers. "Base" means that the motion vector is determined without the boundary search, and "boundary" means that the boundary search is used further. "Final adjustment with 8 neighbors" means that the final adjustment is performed on eight neighboring pixels around a block, while "final adjustment with 4 neighbors" means that final adjustment is performed on four neighboring pixels around a block.

Table 1 shows a result of a simulation of various search methods on a sample picture of QCIF-salesman.

TABLE 1

Result of simulation on a picture of QCIF-salesman

| Type of Search | | Operation time (%) | Image Quality (PNSR) | |
|---|---|---|---|---|
| FS (MSE) | | 100.00 | 40.53 | 0.16 |
| FS (MAE) | | 100.00 | 40.53 | 0.00 |
| FS (¼ MAE) | | 25.00 | 40.32 | −0.05 |
| GRS (H2) | base | 1.70 | 40.35 | −0.02 |
| | boundary | 1.75 | 40.35 | −0.02 |
| GRS (H1) | base | 1.49 | 40.35 | −0.02 |
| | boundary | 1.55 | 40.35 | −0.02 |
| GDS (H3, 2:2:2) | base + final adjustment with 8 neighbors | 1.91 | 40.53 | 0.16 |
| | boundary + final adjustment with 8 neighbors | 2.02 | 40.53 | 0.16 |
| | base + final adjustment with 4 neighbors | 1.43 | 40.47 | 0.10 |
| | boundary + final adjustment with 4 neighbors | 1.50 | 40.47 | 0.10 |
| GDS (H2, 0:2:2) | base + final adjustment with 8 neighbors | 1.86 | 40.53 | 0.16 |
| | boundary + final adjustment with 8 neighbors | 1.97 | 40.53 | 0.16 |
| | base + final adjustment with 4 neighbors | 1.38 | 40.47 | 0.10 |
| | boundary + final adjustment with 4 neighbors | 1.45 | 40.47 | 0.10 |
| GDS (H1, 0:0:2) | base + final adjustment with 8 neighbors | 1.67 | 40.48 | 0.11 |
| | boundary + final adjustment with 8 neighbors | 1.78 | 40.48 | 0.11 |
| | base + final adjustment with 4 neighbors | 1.20 | 40.38 | 0.01 |
| | boundary + final adjustment with 4 neighbors | 1.26 | 40.38 | 0.01 |
| GDS + SB (H2, 0:2:2) | base + final adjustment with 8 neighbors | 2.63 | 40.53 | 0.16 |
| | boundary + final adjustment with 8 neighbors | 2.79 | 40.53 | 0.16 |
| | base + final adjustment with 4 neighbors | 2.11 | 40.49 | 0.12 |
| | boundary + final adjustment with 4 neighbors | 2.27 | 40.49 | 0.12 |

Table 2 shows a result of a simulation of various search methods on a sample picture (QCIF-Susie).

TABLE 2

Result of simulation on a picture of QCIF-Susie

| Type of Search | | Operation time (%) | Image Quality (PNSR) | |
|---|---|---|---|---|
| FS (MSE) | | 100.00 | 37.98 | 0.19 |
| FS (MAE) | | 100.00 | 37.79 | 0.00 |
| FS (¼ MAE) | | 25.00 | 37.42 | −0.37 |
| GRS (H2) | base | 2.31 | 36.79 | −1.00 |
| | boundary | 2.42 | 36.80 | −0.99 |
| GRS (H1) | base | 1.85 | 37.36 | −0.43 |
| | boundary | 1.97 | 37.37 | −0.42 |
| GDS (H3, 2:2:2) | base + final adjustment with 8 neighbors | 2.02 | 37.47 | −0.32 |
| | boundary + final adjustment with 8 neighbors | 2.14 | 37.50 | −0.29 |
| | base + final adjustment with 4 neighbors | 1.54 | 37.18 | −0.61 |
| | boundary + final adjustment with 4 neighbors | 1.62 | 37.20 | −0.59 |
| GDS (H2, 0:2:2) | base + final adjustment with 8 neighbors | 1.95 | 37.55 | −0.24 |
| | boundary + final adjustment with 8 neighbors | 2.09 | 37.57 | −0.22 |
| | base + final adjustment with 4 neighbors | 1.48 | 37.25 | −0.54 |
| | boundary + final adjustment with 4 neighbors | 1.56 | 37.28 | −0.51 |
| GDS (H1, 0:0:2) | base + final adjustment with 8 neighbors | 1.74 | 37.34 | −0.45 |
| | boundary + final adjustment with 8 neighbors | 1.86 | 37.37 | −0.42 |
| | base + final adjustment with 4 neighbors | 1.26 | 36.99 | −0.80 |
| | boundary + final adjustment with 4 neighbors | 1.33 | 37.02 | −0.77 |
| GDS + SB (H2, 0:2:2) | base + final adjustment with 8 neighbors | 2.82 | 37.67 | −0.12 |
| | boundary + final adjustment with 8 neighbors | 3.02 | 37.68 | −0.11 |
| | base + final adjustment with 4 neighbors | 2.29 | 37.37 | −0.42 |
| | boundary + final adjustment with 4 neighbors | 2.49 | 37.39 | −0.40 |

Table 3 shows a result of a simulation of various search methods on a sample picture (QCIF-mobile & calendar).

TABLE 3

Result of simulation on a picture of QCIF-mobile & calendar

| Type of Search | | Operation time (%) | Image Quality (PNSR) | |
|---|---|---|---|---|
| FS (MSE) | | 100.00 | 27.89 | 0.06 |
| FS (MAE) | | 100.00 | 27.82 | −0.01 |
| FS (¼ MAE) | | 25.00 | 27.82 | −0.01 |
| GRS (H2) | base | 2.10 | 27.91 | 0.08 |
| | boundary | 2.23 | 28.09 | 0.23 |
| GRS (H1) | base | 1.49 | 27.76 | −0.07 |
| | boundary | 1.56 | 28.09 | 0.26 |

TABLE 3-continued

Result of simulation on a picture of QCIF-mobile & calendar

| Type of Search | | Operation time (%) | Image Quality (PNSR) | |
|---|---|---|---|---|
| GDS (H3, 2:2:2) | base + final adjustment with 8 neighbors | 1.94 | 27.83 | 0.00 |
| | boundary + final adjustment with 8 neighbors | 2.08 | 27.98 | 0.15 |
| | base + final adjustment with 4 neighbors | 1.46 | 27.81 | −0.02 |
| | boundary + final adjustment with 4 neighbors | 1.56 | 27.96 | 0.13 |
| GDS (H2, 0:2:2) | base + final adjustment with 8 neighbors | 1.88 | 27.83 | 0.00 |
| | boundary + final adjustment with 8 neighbors | 2.03 | 27.97 | 0.14 |
| | base + final adjustment with 4 neighbors | 1.41 | 27.81 | −0.02 |
| | boundary + final adjustment with 4 neighbors | 1.51 | 27.95 | 0.12 |
| GDS (H1, 0:0:2) | base + final adjustment with 8 neighbors | 1.70 | 27.83 | 0.00 |
| | boundary + final adjustment with 8 neighbors | 1.84 | 27.97 | 0.14 |
| | base + final adjustment with 4 neighbors | 1.22 | 27.80 | −0.03 |
| | boundary + final adjustment with 4 neighbors | 1.32 | 27.95 | 0.12 |
| GDS + SB (H2, 0:2:2) | base + final adjustment with 8 neighbors | 2.73 | 27.98 | 0.15 |
| | boundary + final adjustment with 8 neighbors | 2.99 | 27.98 | 0.15 |
| | base + final adjustment with 4 neighbors | 2.21 | 27.96 | 0.13 |
| | boundary + final adjustment with 4 neighbors | 2.45 | 27.96 | 0.13 |

Table 4 shows a result of a simulation of various search methods on a sample picture (QCIF-bus).

TABLE 4

Result of simulation on a picture of QCIF-bus

| Type of Search | | Operation time (%) | Image Quality (PNSR) | |
|---|---|---|---|---|
| FS (MSE) | | 100.00 | 25.81 | 0.21 |
| FS (MAE) | | 100.00 | 25.60 | 0.00 |
| FS (¼ MAE) | | 25.00 | 25.18 | −0.42 |
| GRS (H2) | base | 2.33 | 23.65 | −1.95 |
| | boundary | 2.39 | 23.95 | −1.65 |
| GRS (H1) | base | 1.84 | 23.89 | −1.17 |
| | boundary | 1.89 | 24.15 | −1.45 |
| GDS (H3, 2:2:2) | base + final adjustment with 8 neighbors | 2.13 | 24.94 | −0.66 |
| | boundary + final adjustment with 8 neighbors | 2.24 | 24.71 | −0.89 |

TABLE 4-continued

Result of simulation on a picture of QCIF-bus

| Type of Search | | Operation time (%) | Image Quality (PNSR) | |
|---|---|---|---|---|
| | base + final adjustment with 4 neighbors | 1.64 | 24.82 | −0.78 |
| | boundary + final adjustment with 4 neighbors | 1.72 | 25.20 | −0.40 |
| GDS (H2, 0:2:2) | base + final adjustment with 8 neighbors | 2.00 | 25.73 | 0.13 |
| | boundary + final adjustment with 8 neighbors | 2.08 | 25.13 | −0.47 |
| | base + final adjustment with 4 neighbors | 1.51 | 25.65 | 0.05 |
| | boundary + final adjustment with 4 neighbors | 1.56 | 24.42 | −1.18 |
| GDS (H1, 0:0:2) | base + final adjustment with 8 neighbors | 1.78 | 25.04 | −0.56 |
| | boundary + final adjustment with 8 neighbors | 1.84 | 24.27 | −1.33 |
| | base + final adjustment with 4 neighbors | 1.26 | 24.80 | −0.80 |
| | boundary + final adjustment with 4 neighbors | 1.30 | 26.42 | 0.82 |
| GDS + SB (H2, 0:2:2) | base + final adjustment with 8 neighbors | 3.00 | 25.66 | 0.06 |
| | boundary + final adjustment with 8 neighbors | 3.26 | 25.91 | 0.31 |
| | base + final adjustment with 4 neighbors | 2.47 | 25.61 | 0.01 |
| | boundary + final adjustment with 4 neighbors | 2.73 | 25.83 | 0.23 |

Table 5 shows a result of a simulation of various search methods on a sample picture (QCIF-flower garden).

TABLE 5

Result of simulation on a picture of QCIF-flower garden

| Type of Search | | Operation time (%) | Image Quality (PNSR) | |
|---|---|---|---|---|
| FS (MSE) | | 100.00 | 27.03 | 0.31 |
| FS (MAE) | | 100.00 | 27.72 | 0.00 |
| FS (¼ MAE) | | 25.00 | 25.71 | −1.01 |
| GRS (H2) | base | 2.25 | 25.49 | −1.23 |
| | boundary | 2.35 | 26.01 | −0.71 |
| GRS (H1) | base | 1.71 | 24.93 | −1.79 |
| | boundary | 1.84 | 25.42 | −1.30 |
| GDS (H3, 2:2:2) | base + final adjustment with 8 neighbors | 2.29 | 25.87 | −0.85 |
| | boundary + final adjustment with 8 neighbors | 2.43 | 26.40 | −0.32 |
| | base + final adjustment with 4 neighbors | 1.80 | 25.74 | −0.98 |
| | boundary + final adjustment with 4 neighbors | 1.91 | 26.29 | −0.43 |

TABLE 5-continued

Result of simulation on a picture of QCIF-flower garden

| Type of Search | | Operation time (%) | Image Quality (PNSR) | |
|---|---|---|---|---|
| GDS (H2, 0:2:2) | base + final adjustment with 8 neighbors | 2.17 | 25.89 | −0.83 |
| | boundary + final adjustment with 8 neighbors | 2.31 | 26.67 | −0.05 |
| | base + final adjustment with 4 neighbors | 1.67 | 25.77 | −0.95 |
| | boundary + final adjustment with 4 neighbors | 1.79 | 26.59 | −0.13 |
| GDS (H1, 0:0:2) | base + final adjustment with 8 neighbors | 1.80 | 23.82 | −2.95 |
| | boundary + final adjustment with 8 neighbors | 1.91 | 25.53 | −1.19 |
| | base + final adjustment with 4 neighbors | 1.30 | 23.67 | −3.05 |
| | boundary + final adjustment with 4 neighbors | 1.38 | 25.39 | −1.33 |
| GDS + SB (H2, 0:2:2) | base + final adjustment with 8 neighbors | 3.14 | 26.65 | −0.07 |
| | boundary + final adjustment with 8 neighbors | 3.43 | 26.74 | −0.02 |
| | base + final adjustment with 4 neighbors | 2.62 | 26.55 | −0.17 |
| | boundary + final adjustment with 4 neighbors | 2.89 | 26.66 | −0.06 |

Next, simulation results on CIF pictures (352*288 pixels). Table 6 shows a result of a simulation of various search methods on a sample picture (CIF-salesman).

TABLE 6

Result of simulation on a picture of CIF-salesman

| Type of Search | | Operation time (%) | Image Quality (PNSR) | |
|---|---|---|---|---|
| FS (MSE) | | 100.00 | 36.30 | 0.12 |
| FS (MAE) | | 100.00 | 36.18 | 0.00 |
| FS (¼ MAE) | | 25.78 | 35.85 | −0.33 |
| GRS (H2) | base | 2.25 | 35.70 | −0.48 |
| | boundary | 2.35 | 35.70 | −0.48 |
| GRS (H1) | base | 1.76 | 35.74 | −0.44 |
| | boundary | 1.80 | 35.74 | −0.44 |
| GDS (H3, 2:2:2) | base + final adjustment with 8 neighbors | 2.11 | 35.97 | −0.21 |
| | boundary + final adjustment with 8 neighbors | 2.17 | 35.97 | −0.21 |
| | base + final adjustment with 4 neighbors | 1.62 | 35.89 | −0.29 |
| | boundary + final adjustment with 4 neighbors | 1.62 | 35.89 | −0.29 |
| GDS (H2, 0:2:2) | base + final adjustment with 8 neighbors | 2.06 | 35.99 | −0.19 |
| | boundary + final adjustment with 8 neighbors | 2.12 | 35.99 | −0.19 |
| | base + final adjustment with 4 neighbors | 1.62 | 35.89 | −0.26 |
| | boundary + final adjustment with 4 neighbors | 1.62 | 35.89 | −0.26 |
| GDS (H1, 0:0:2) | base + final adjustment with 8 neighbors | 1.85 | 36.05 | −0.13 |
| | boundary + final adjustment with 8 neighbors | 1.91 | 36.05 | −0.13 |
| | base + final adjustment with 4 neighbors | 1.31 | 35.52 | −0.66 |
| | boundary + final adjustment with 4 neighbors | 1.35 | 35.52 | −0.66 |
| GDS + SB (H2, 0:2:2) | base + final adjustment with 8 neighbors | 3.33 | 36.03 | −0.15 |
| | boundary + final adjustment with 8 neighbors | 3.52 | 36.03 | −0.15 |
| | base + final adjustment with 4 neighbors | 2.80 | 35.95 | −0.23 |
| | boundary + final adjustment with 4 neighbors | 3.52 | 35.86 | −0.22 |

Table 7 shows a result of a simulation of various search methods on a sample picture (CIF-Susie).

TABLE 7

Result of simulation on a picture of CIF-Susie

| Type of Search | | Operation time (%) | Image Quality (PNSR) | |
|---|---|---|---|---|
| FS (MSE) | | 100.00 | 39.66 | 0.13 |
| FS (MAE) | | 100.00 | 39.52 | 0.00 |
| FS (¼ MAE) | | 25.78 | 38.40 | −1.23 |
| GRS (H2) | base | 2.63 | 38.57 | −0.95 |
| | boundary | 2.67 | 38.60 | −0.92 |
| GRS (H1) | base | 1.84 | 39.09 | −0.43 |
| | boundary | 1.91 | 39.11 | −0.69 |
| GDS (H3, 2:2:2) | base + final adjustment with 8 neighbors | 2.30 | 38.83 | −0.67 |
| | boundary + final adjustment with 8 neighbors | 2.37 | 38.85 | −1.11 |
| | base + final adjustment with 4 neighbors | 1.77 | 38.41 | −1.09 |
| | boundary + final adjustment with 4 neighbors | 1.81 | 38.43 | −0.59 |
| GDS (H2, 0:2:2) | base + final adjustment with 8 neighbors | 2.23 | 39.01 | −0.51 |
| | boundary + final adjustment with 8 neighbors | 2.30 | 39.02 | −0.50 |
| | base + final adjustment with 4 neighbors | 1.69 | 38.59 | −0.93 |

TABLE 7-continued

Result of simulation on a picture of CIF-Susie

| Type of Search | | Operation time (%) | Image Quality (PNSR) | |
|---|---|---|---|---|
| | boundary + final adjustment with 4 neighbors | 1.74 | 38.59 | −0.93 |
| GDS (H1, 0:0:2) | base + final adjustment with 8 neighbors | 1.94 | 38.15 | −1.37 |
| | boundary + final adjustment with 8 neighbors | 2.00 | 38.32 | −1.20 |
| | base + final adjustment with 4 neighbors | 1.39 | 37.08 | −2.44 |
| | boundary + final adjustment with 4 neighbors | 1.43 | 37.17 | −2.35 |
| GDS + SB (H2, 0:2:2) | base + final adjustment with 8 neighbors | 2.58 | 39.14 | −0.38 |
| | boundary + final adjustment with 8 neighbors | 3.82 | 39.18 | −0.34 |
| | base + final adjustment with 4 neighbors | 3.04 | 38.71 | −0.81 |
| | boundary + final adjustment with 4 neighbors | 3.24 | 38.76 | −0.76 |

Table 8 shows a result of a simulation of various search methods on a sample picture (CIF-mobile & calendar).

TABLE 8

Result of simulation on a picture of CIF-mobile & calendar

| Type of Search | | Operation time (%) | Image Quality (PNSR) | |
|---|---|---|---|---|
| FS (MSE) | | 100.00 | 26.34 | 0.10 |
| FS (MAE) | | 100.00 | 26.24 | 0.00 |
| FS (¼ MAE) | | 25.78 | 25.18 | −1.06 |
| GRS (H2) | base | 2.33 | 25.92 | −0.32 |
| | boundary | 2.38 | 26.44 | 0.20 |
| GRS (H1) | base | 1.68 | 26.05 | −0.19 |
| | boundary | 1.74 | 26.45 | 0.21 |
| GDS (H3, 2:2:2) | base + final adjustment with 8 neighbors | 2.42 | 26.02 | −0.22 |
| | boundary + final adjustment with 8 neighbors | 2.51 | 26.44 | 0.20 |
| | base + final adjustment with 4 neighbors | 1.89 | 25.81 | −0.43 |
| | boundary + final adjustment with 4 neighbors | 1.95 | 26.20 | −0.04 |
| GDS (H2, 0:2:2) | base + final adjustment with 8 neighbors | 2.37 | 26.05 | −0.19 |
| | boundary + final adjustment with 8 neighbors | 2.46 | 26.48 | 0.24 |
| | base + final adjustment with 4 neighbors | 1.84 | 25.84 | −0.40 |
| | boundary + final adjustment with 4 neighbors | 1.90 | 26.24 | 0.00 |

TABLE 8-continued

Result of simulation on a picture of CIF-mobile & calendar

| Type of Search | | Operation time (%) | Image Quality (PNSR) | |
|---|---|---|---|---|
| GDS (H1, 0:0:2) | base + final adjustment with 8 neighbors | 1.85 | 23.08 | −3.16 |
| | boundary + final adjustment with 8 neighbors | 1.96 | 24.75 | −1.49 |
| | base + final adjustment with 4 neighbors | 1.35 | 22.52 | −3.72 |
| | boundary + final adjustment with 4 neighbors | 1.37 | 24.26 | −1.98 |
| GDS + SB (H2, 0:2:2) | base + final adjustment with 8 neighbors | 3.71 | 26.11 | −0.13 |
| | boundary + final adjustment with 8 neighbors | 4.00 | 26.58 | 0.34 |
| | base + final adjustment with 4 neighbors | 3.18 | 25.90 | −0.34 |
| | boundary + final adjustment with 4 neighbors | 3.40 | 26.35 | 0.11 |

Table 9 shows a result of a simulation of various search methods on a sample picture (CIF-bus).

TABLE 9

Result of simulation on a picture of CIF-bus

| Type of Search | | Operation time (%) | Image Quality (PNSR) | |
|---|---|---|---|---|
| FS (MSE) | | 100.00 | 27.92 | 0.30 |
| FS (MAE) | | 100.00 | 25.60 | 0.00 |
| FS (¼ MAE) | | 25.78 | 25.18 | −0.82 |
| GRS (H2) | base | 2.58 | 25.37 | −2.25 |
| | boundary | 2.60 | 25.59 | −2.03 |
| GRS (H1) | base | 1.88 | 25.95 | −1.67 |
| | boundary | 1.92 | 26.10 | −1.52 |
| GDS (H3, 2:2:2) | base + final adjustment with 8 neighbors | 2.37 | 26.91 | −0.71 |
| | boundary + final adjustment with 8 neighbors | 2.41 | 27.11 | −0.51 |
| | base + final adjustment with 4 neighbors | 1.82 | 26.74 | −0.88 |
| | boundary + final adjustment with 4 neighbors | 1.85 | 26.94 | −0.68 |
| GDS (H2, 0:2:2) | base + final adjustment with 8 neighbors | 2.23 | 27.24 | −0.38 |
| | boundary + final adjustment with 8 neighbors | 2.27 | 27.46 | −0.16 |
| | base + final adjustment with 4 neighbors | 1.68 | 27.03 | −0.59 |
| | boundary + final adjustment with 4 neighbors | 1.71 | 27.26 | −0.36 |
| GDS (H1, 0:0:2) | base + final adjustment with 8 neighbors | 1.91 | 26.53 | −1.09 |
| | boundary + final adjustment with 8 neighbors | 1.95 | 26.78 | −0.84 |

TABLE 9-continued

Result of simulation on a picture of CIF-bus

| Type of Search | | Operation time (%) | Image Quality (PNSR) | |
|---|---|---|---|---|
| | base + final adjustment with 4 neighbors | 1.34 | 26.20 | −1.42 |
| | boundary + final adjustment with 4 neighbors | 1.38 | 26.42 | −1.20 |
| GDS + SB (H2, 0:2:2) | base + final adjustment with 8 neighbors | 3.79 | 27.41 | −0.21 |
| | boundary + final adjustment with 8 neighbors | 4.05 | 27.58 | −0.04 |
| | base + final adjustment with 4 neighbors | 3.24 | 27.61 | −0.39 |
| | boundary + final adjustment with 4 neighbors | 3.47 | 27.23 | −0.21 |

Table 10 shows a result of a simulation of various search methods on a sample picture (CIF-flower garden).

TABLE 10

Result of simulation on a picture of CIF-flower garden

| Type of Search | | Operation time (%) | Image Quality (PNSR) | |
|---|---|---|---|---|
| FS (MSE) | | 100.00 | 28.17 | 0.10 |
| FS (MAE) | | 100.00 | 28.07 | 0.00 |
| FS (¼ MAE) | | 25.78 | 26.80 | −1.27 |
| GRS (H2) | base | 2.28 | 27.45 | −0.62 |
| | boundary | 2.32 | 27.62 | −0.45 |
| GRS (H1) | base | 1.78 | 27.11 | −0.96 |
| | boundary | 1.84 | 27.25 | −0.82 |
| GDS (H3, 2:2:2) | base + final adjustment with 8 neighbors | 2.44 | 27.03 | −1.04 |
| | boundary + final adjustment with 8 neighbors | 2.51 | 27.23 | −0.84 |
| | base + final adjustment with 4 neighbors | 1.90 | 26.93 | −1.14 |
| | boundary + final adjustment with 4 neighbors | 1.95 | 27.13 | −0.94 |
| GDS (H2, 0:2:2) | base + final adjustment with 8 neighbors | 2.32 | 27.44 | −0.63 |
| | boundary + final adjustment with 8 neighbors | 2.39 | 27.66 | −0.41 |
| | base + final adjustment with 4 neighbors | 1.78 | 27.34 | −0.73 |
| | boundary + final adjustment with 4 neighbors | 1.83 | 27.57 | −0.50 |
| GDS (H1, 0:0:2) | base + final adjustment with 8 neighbors | 1.89 | 25.56 | −2.51 |
| | boundary + final adjustment with 8 neighbors | 1.95 | 25.62 | −2.45 |
| | base + final adjustment with 4 neighbors | 1.34 | 23.17 | −2.90 |
| | boundary + final adjustment with 4 neighbors | 1.38 | 25.45 | −2.62 |

TABLE 10-continued

Result of simulation on a picture of CIF-flower garden

| Type of Search | | Operation time (%) | Image Quality (PNSR) | |
|---|---|---|---|---|
| GDS + SB (H2, 0:2:2) | base + final adjustment with 8 neighbors | 3.81 | 27.58 | −0.49 |
| | boundary + final adjustment with 8 neighbors | 4.08 | 27.86 | −0.21 |
| | base + final adjustment with 4 neighbors | 3.27 | 27.49 | −0.58 |
| | boundary + final adjustment with 4 neighbors | 3.49 | 27.79 | −0.28 |

Figure 12:
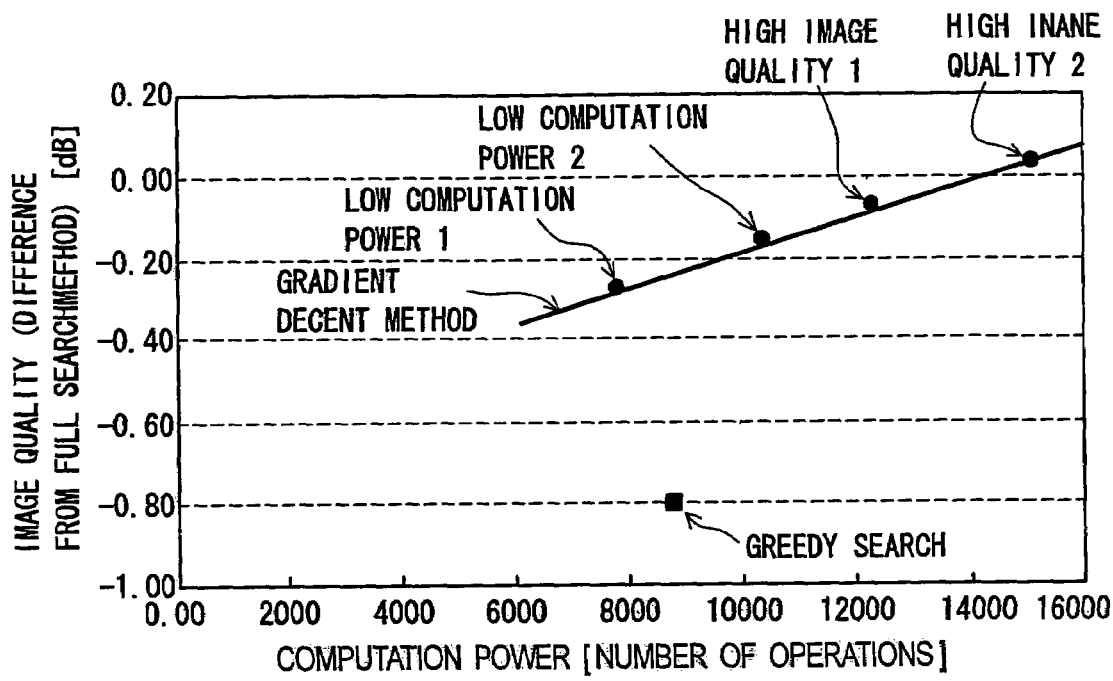
FIG. 12 is a graph on a relationship between the required computation power and image quality on QCIF pictures.
Figure 13:
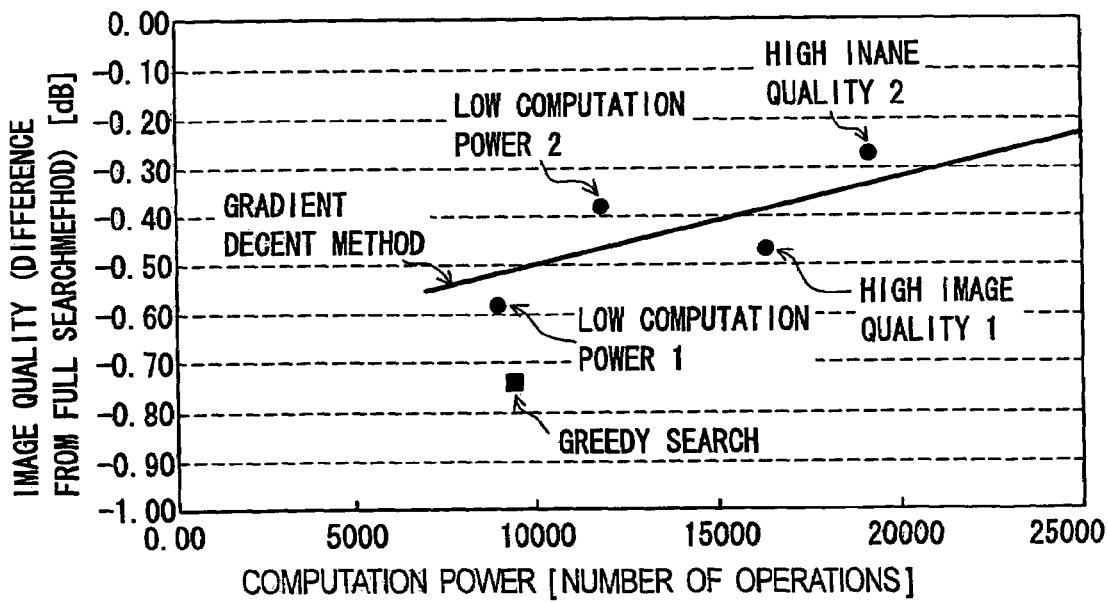
FIG. 13 is a graph on a relationship between the required computation power and image quality on CIF pictures.

FIGS. 12 and 13 show a relationship between the computation power and image quality on the above-mentioned search on the QCIF pictures and on the CIF pictures, respectively. The data used for the data shown in these graphs are first high image quality mode (subblock search, base+final adjustment with 4 neighbors), second high image quality mode (subblock search, base+final adjustment with 8 neighbors), first low computation power mode (macroblock search, base+final adjustment with 4 neighbors), second low computation power mode (macroblock search, base+final adjustment with 8 neighbors), and greedy search method. The data shown in the graphs are averages of the results on the five QCIF or CIF pictures used for the simulations. The simulation results show that the gradient descent method can decrease the computation power to a large extent if compared with the full search method, so that the electric consumption power can be decreased largely. In the first and second high image quality modes, the computation power is increased about twice those of the greedy search method and the first and second low consumption power modes, but the image quality is about the same as that of the full search method. Among the fist and second high image quality modes, the second is superior to the first on image quality. The image quality and the computation power have a relationship of tradeoff between them. Therefore, in an embodiment, a user is allowed to select one of these modes.

Figure 14:
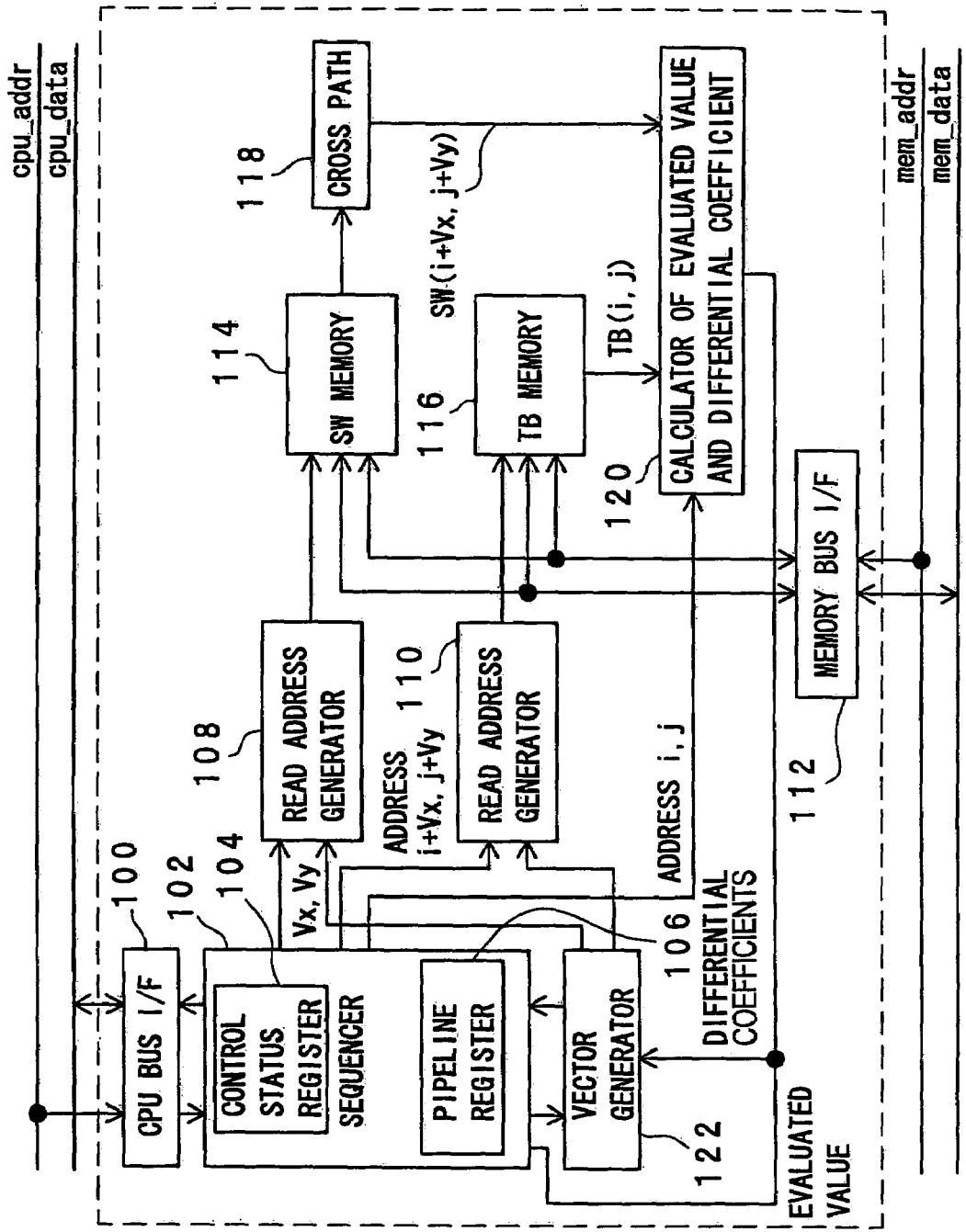
FIG. 14 is a block diagram of a motion compensator which performs subblock search.
Figure 15:
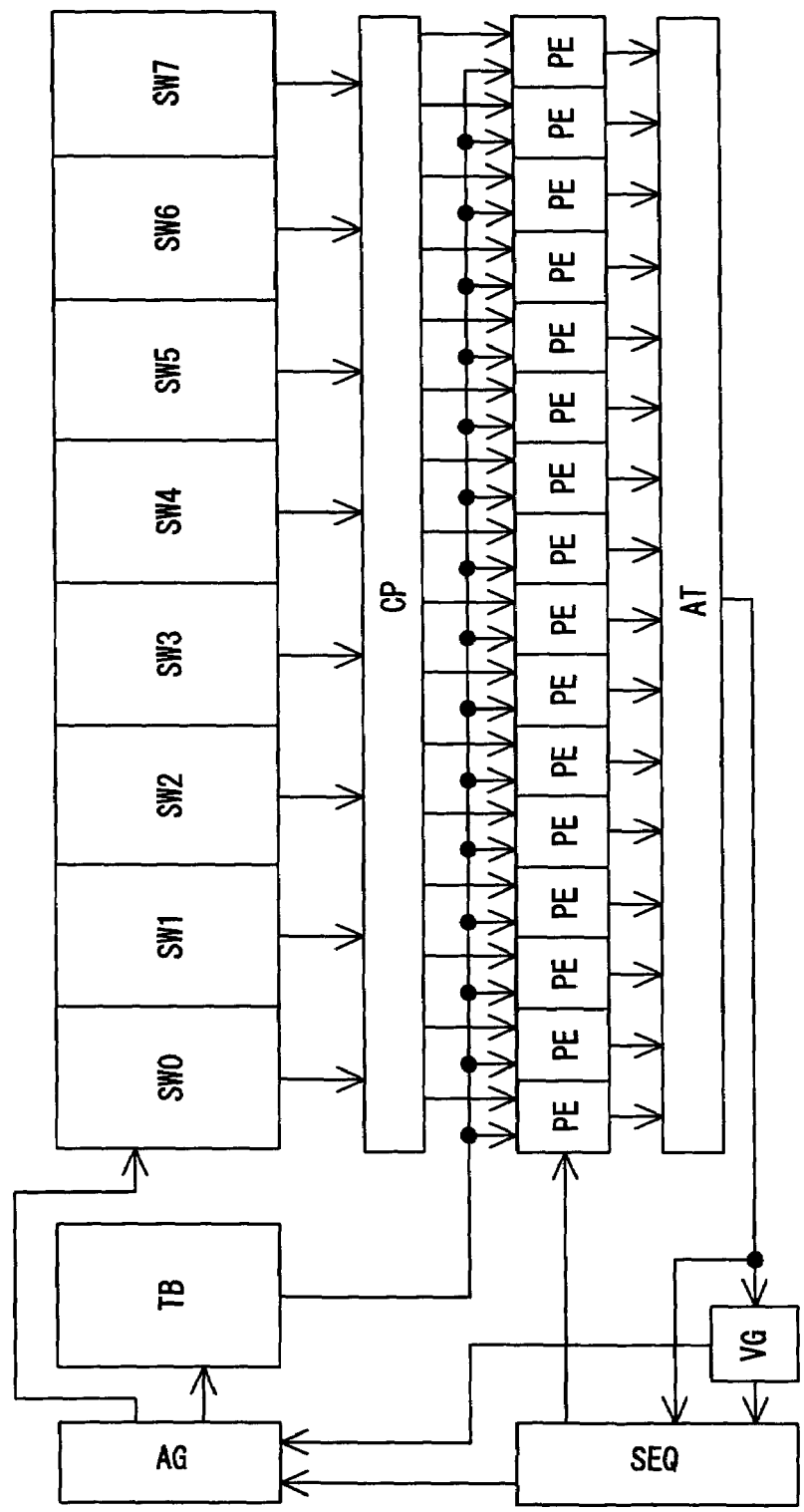
FIG. 15 is another block diagram of the motion compensator.

Next, a VLSI architecture of an MPEG encoder used for the subblock search is explained. In the MPEG encoder, the motion compensator performs the subblock search to determine a motion vector. FIG. 14 shows main components in the motion compensator, while FIG. 15 shows the internal structure thereof from a different viewpoint. The motion compensator can be operated in the above-mentioned four modes (that is, first and second high image quality modes and first and second low consumption power modes). The VLSI architecture has following characteristics: (1) Processing elements (PE) in the calculator able to calculate the evaluated value E and the differential coefficients thereof, (2) SIMD (Single Instruction/Multiple Data) data path connecting 16 processing elements in parallel, and (3) image memories of 3-ports RAM of low consumption power as image data caches. By using the processing elements, various calculations necessary for calculating the evaluated value E and the differential coefficients thereof can be performed by receiving image data and control signals to the processing elements. Further, by using the parallel connection of 16 processing elements, a calculation on 16 pixels (one line in a search block) can be performed in one cycle.

Further, because the image data caches (TB memory and SW memory) have low consumption power, the consumption power of the motion compensator can be decreased to a large extent. An estimation of the consumption power of the motion compensator shows that it is expected to decrease the consumption power to sub mW.

The structure of the motion compensator shown in FIG. 14 is explained below. A sequencer (SEQ) 102 is connected through a CPU bus interface and a CPU bus to a central processing unit (CPU) (not shown). SW memories 114 and a TB memory 116 are connected through a memory bus interface 112 and a memory bus to a frame memory (not shown). The TB memory 116 is a random access memory which stores a template block data used for detecting a motion vector. The template block is provided for each hierarchical layer for the three hierarchical layer search. It has a size of 16*16 pixels, and data of a next macroblock is written while a current macroblock is processed. The SW memory 114 is a random access memory which stores the template block data. The template block is provided for each hierarchical layer for the three hierarchical layer search. The maximum search range in each hierarchical layer is ±4*±4 for the third hierarchical layer, ±8*±8 for the second hierarchical layer, and ±16*±16 for the first hierarchical layer. The number of pixels necessary to write picture data of a next macroblock while a current macroblock is processed is 4*10 pixels for the first hierarchical layer, 8*20 pixels for the second hierarchical layer, and 16*40 pixels for the third hierarchical layer. The sequencer 102 includes control state registers 104, to which the CPU sets various parameters and commands and in which the evaluated value E and parameters such as motion vector $V_x$, $V_y$ are stored. The parameters include a base address and an offset of search window, search range of search window, initial vector, motion vector detection command, data for interrupt to start motion vector detection, and the number of points to be searched. Further, the sequencer 102 includes a pipeline register 106 and has a pipeline structure optimized for the calculation of the evaluated value and the differential coefficients thereof. The SW read address generator 108 and the TB read address generator 110 send addresses in correspondence, for example, to pixel position (i, j) and to (i+Vx, j+Vy) to the SW memories 114 and to the TB memory 116 according to the parameters from the sequencer 102, respectively. The pixel data of the SW memories 114 are sent to the calculator 120 for the evaluated value and the differential coefficients, and the data of the TB memory 116 is sent via a cross path 118 to the calculator 120. In the calculator 120, the processing elements (PE) perform the calculation in parallel, and an adder outputs the evaluated value or the x or y differential coefficients. The adder is practically an adder-tree (AT) as a combination of adders for summing the results of the calculation. The calculator 120 performs different types of calculations according to the control signals. By providing a half-pel blender in the processing element, the search can be performed in the precision of half-pel.

In FIG. 15, reference sign "AG" corresponds to the SW read address generator 108 and the TB read address generator 110, "SEQ" corresponds to the sequencer 102, "TB" corresponds to the TB memory 116, "SW0" to "SW7" correspond to the SW memories, "PE" corresponds to the processing element, and "AT" corresponds to the adder (or adder-tree). Because 16 processing elements are used, the calculation of the evaluated value or differential coefficients thereof can be executed at 16 pixels/cycle. The calculation is repeated in the search range, and the results of the calculation are added. The obtained result of the evaluated value or differential coefficient thereof is outputted.

The CPU sets parameters (size of search window and motion vector detection command) in the unit of frame to the control state registers 104 for each frame. The CPU writes picture data to the TM memory 116 and to the SW memories 114 from the frame memory for each macroblock. The CPU further sets parameters (base, offset address, search range, initial vector number, current template buffer) in the unit of macroblock.

Next, motion detection is performed for each macroblock. The CPU sets parameters on the number of commands and an interrupt in a motion detection start register in the control state registers 104 and starts the motion detection.

In the motion detection, the sequencer 102 sends control signals to the TB address generator 110, the SW address generator 108, the calculator 120 and the adder (AT) for each macroblock according to the parameters set in the control state registers 104. The TB address generator 110 and the SW address generator 108 output addresses to the TB memory 116 and to the SW memories 114 according to the control signals of the sequencer 102, and the TB memory 116 and the SW memories 114 send pixel data to the calculator 120. The calculator 120 receives the pixel data, calculates the evaluated value and the differential coefficients thereof, detects the motion vector and sends the motion vector to the control state registers 104.

On the other hand, the motion detection is also performed on each subblock. The CPU sets parameters on the number of commands and an interrupt in the motion detection start register in the control state registers 104 and starts the motion detection. In the motion detection, the sequencer 102 sends control signals to the TB address generator 110, the SW address generator 108, the calculator 120 and the adder-tree (AT) for each subblock according to the parameters set in the control state registers 104. The TB address generator 110 and the SW address generator 108 output addresses to the TB memory 116 and to the SW memories 114 according to the control signals of the sequencer 102, and the TB memory 116 and to the SW memories 114 send pixel data to the calculator 120. The calculator 120 receives the pixel data, calculates the evaluated value and the differential coefficients, detects the motion vector and sends the motion vector to the control state registers 104.

Next, the final adjustment is performed. According to parameters in the control status registers 104, the sequencer 102 outputs control signals to the TB address generator 110, the SW address generator 108 and the calculator 120 for the evaluated value and the differential coefficient thereof, and the adder-tree. The TB address generator 110 and the SW address generator 108 send addresses to the TM memory 116 and to the SW memories 114 according to the control signals of the sequencer 102, and the TM memory 116 and the SW memories 114 send pixel data to the calculator 120. It is to be noted that the SW data are processed in the unit of half-pel by the half-pel blender. The calculator 120 calculates the evaluated value and the differential coefficients thereof based on the pixel data according to the control signals and writes the motion vector to the control state registers 104.

Finally, the CPU reads the motion vector in the control status registers 104 for each macroblock.

Figure 16:
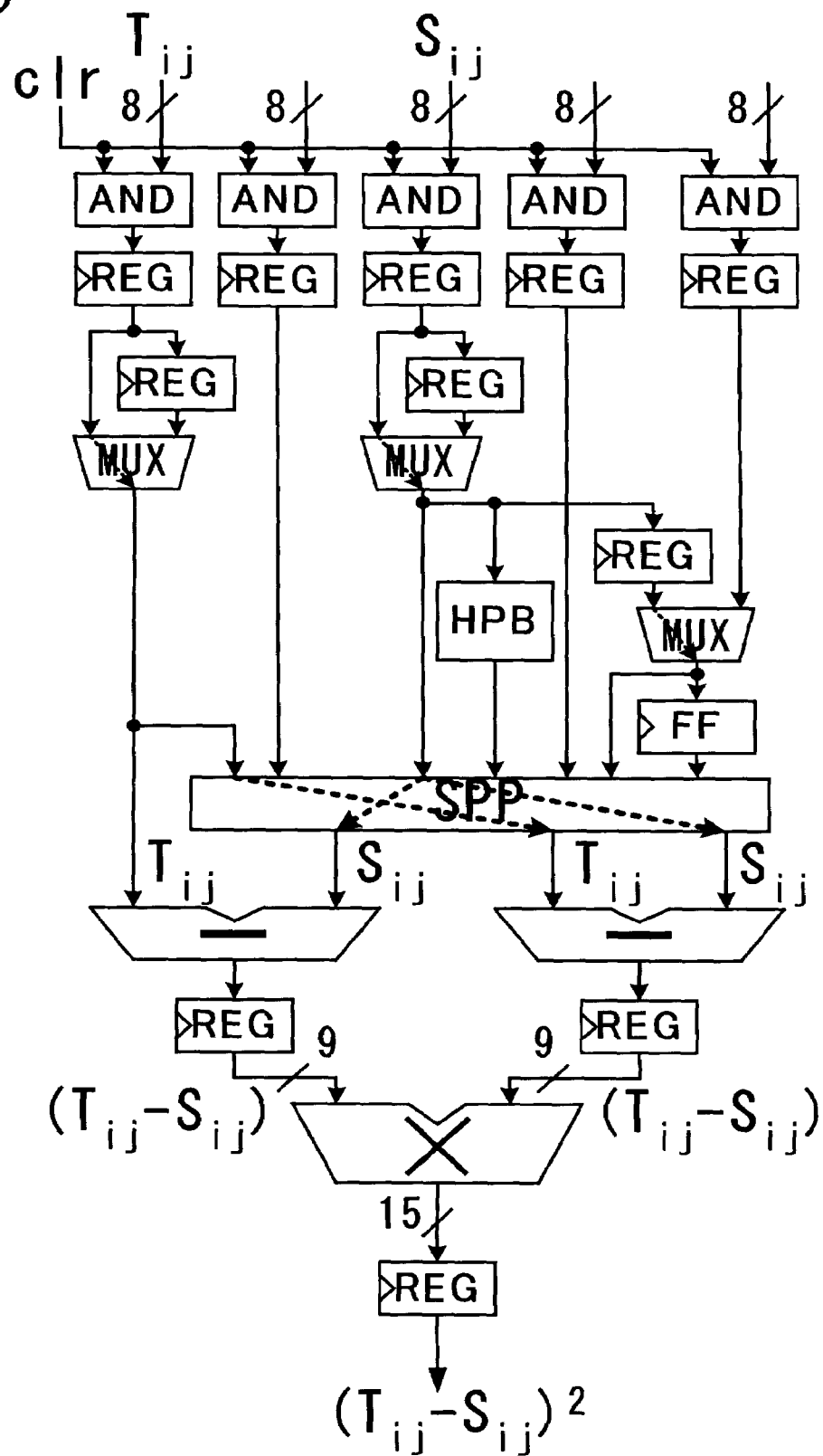
FIG. 16 is a block diagram of a processing element.

A characteristic of this circuit structure is that the evaluated value and the differential coefficient thereof are calculated by the calculator 120 as will be explained below in detail. FIG. 16 shows a block diagram of the processing element (PE) for calculating both the evaluated value and the differential coefficients thereof. As explained above, in the calculation of the evaluated value and the differential coefficients thereof, subtraction of $TB_{i,j}-SW_{i+Vx,j+Vy}$, subtractions of $SW_{i-1,j}-SW_{i+1,j}$, $SW_{i,j+1}-SW_{i,j-1}$ in x and y directions, multiplication of two such factors, and addition of the products are necessary. In the calculations, i is changed between 0 to 7 or 0 to 15, and the obtained results are added. Because 16 processing elements are used, calculations on 16 pixels in a line can be calculated in parallel in a cycle. Because both evaluated value and differential coefficients thereof can be calculated in the processing element, the calculation necessary to detect the motion can be performed by using one type of processing element. Table 11 shows input/output signals on the processing element.

TABLE 11

Input/output signals of the processing element

| Signal name | Direction | Explanation |
|---|---|---|
| clk | Input | Clock |
| ctrl[3:0] | Input | Control signal |
| ctrl_hp[5:0] | Input | Control signal for HPB |
| t[7:0] | Input | Input from TB |
| s0[7:0] | Input | Input from SW(left neighbor) |
| s1[7:0] | Input | Input from SW |
| s2[7:0] | Input | Input from SW(right neighbor) |
| s3[7:0] | Input | Input from SW(left or right neighbor) |
| result_pe[14:0] | Output | Result |

As shown in FIG. 16, a data of eight bits and clear signal, clr, are received by the first to fifth AND gates in parallel to each other, and the outputs thereof are stored in the first to fifth registers (REG). By using the five registers, a difference between values of two adjacent pixels necessary in the calculation of a differential are available, so that the above-mentioned x and y differential coefficients can be calculated. As shown in Table 11, the input data from the TB memory to the AND gates are denoted as "t", an input data from the SW memory (for the left neighbor) is denoted as "s0", an input data from the SW memory (for the right neighbor) is denoted as "s2", and input data from the SW memory (for the left or right neighbor) is denoted as "s3". The input signals to the AND gates are controlled by the control signals, ctr, from the sequencer 102. Data at the first and third registers are directly inputted to first and second multiplexers (MUX), and are inputted thereto after stored in other registers. The output signal of the first multiplexer (MUX) is sent to a switch circuit (SPP) and the first subtractor circuit. The output signal of the second multiplexer is sent to the switch circuit (SPP) directly or via the half-pel blender (HPB), and it is also sent via a register (REG) to a third multiplexer (MUX). The half-pel blender (HPB) is controlled by a control signal ctrl_hpb (refer to Table 12). The output signal of the fourth register is sent to the switch circuit SPP. The output signal of the fifth register is sent to a third multiplexer (MUX). The output signal of the third multiplexer is sent directly or after stored in another register to the switch circuit SPP. The switch circuit (SPP) is controlled according to the control signal, ctrl. The three output signals of the switch circuit are sent to an input of the first subtracter circuit and to two inputs of the second subtracter circuit. As explained above, the switch circuit (SPP) can receive seven input signals and send three output signals. In concrete, the sequencer 102 changes the destinations of the input signals, as shown in FIGS. 17 to 27, according to the control signal ctrl to the switch circuit SPP and the signals to the first to third multiplexers (MUX). The switch circuit (SPP) is constructed as a combination of various switch elements, not explained in detail. The output signals of the first and second subtractor circuits are sent to the multiplier circuit, and a result of the multiplication is stored in the register or outputted from the register.

The control signal, ctrl, includes designation of search mode, designation of search hierarchical layer, designation of subblock search, designation of TB size, and designation of step width of search. The search mode includes calculation of initial value, calculation of x differential coefficient, calculation of y differential coefficient, calculation of the evaluated value, one-dimensional search, final adjustment using four neighbors and final adjustment using eight neighbors.

The control signal, ctrl_hpb, for controlling the half-pel blender (HPB) is generated by a decoder (not shown) provided in the processing element (PE). Table 12 shows input signal, ctrl[3:0], and output signal, ctrl_pel[3:0], of the decoder.

TABLE 12

Internal control signals

| ctrl [3:0] | ctrl_pel [3:0] | Timing of calculation of what? |
|---|---|---|
| 0000 | 0000000000 | evaluated value |
| 0001 | 1001000000 | x differential coefficient (left end) |
| 0010 | 1000100000 | x differential coefficient (except left and right ends) |
| 0011 | 0000100000 | x differential coefficient (right end) |
| 0100 | 0001110001 | y differential coefficient (1st layer/cycle 1 & top end) |
| 0101 | 0010010001 | y differential coefficient (1st layer/other than top and bottom ends) |
| 0110 | 1110010001 | y differential coefficient (1st layer/cycle 1 & bottom end) |
| 0111 | 1101000100 | y differential coefficient (2, 3 layers/even, cycle 1) |
| 1000 | 1110000111 | y differential coefficient (2, 3 layers/odd, cycles 1–4) |
| 1001 | 1110000100 | y differential coefficient (2, 3 layers/even, cycle 2–5) |
| 1010 | 0010000111 | y differential coefficient (2, 3 layers/odd, cycle 5) |
| 1011 | 0100001000 | Final adjustment |
| others | . . . | . . . |

FIGS. 17-27 show states for various type of calculation in the processing element PE.

Figure 17:
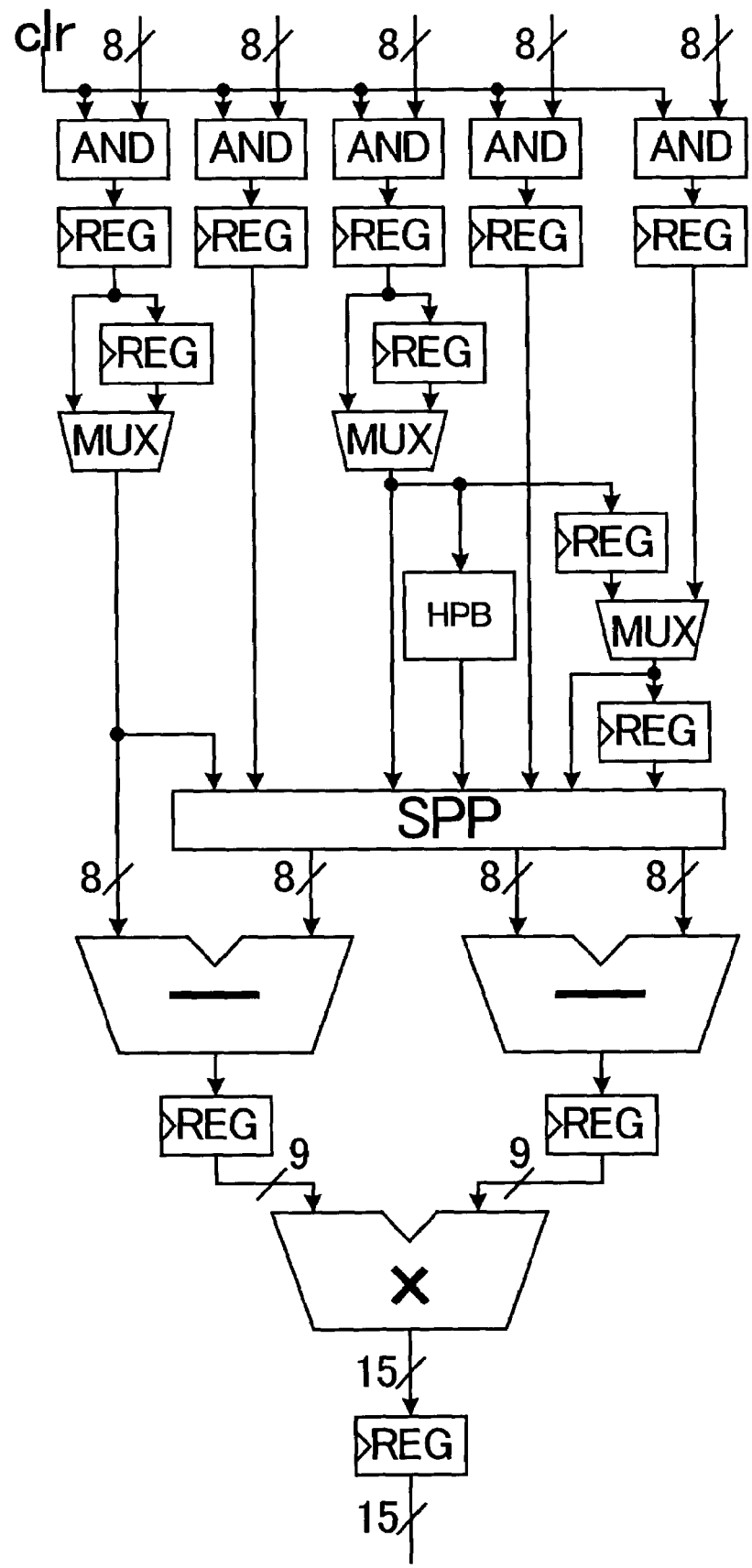
FIG. 17 is a diagram of the processing element when an evaluated value is calculated.

FIG. 17 shows a state in the processing element PE when $(TB_{i,j}-SW_{i,j})^2$ is calculated in the calculation of the evaluated value E.

Figure 18:
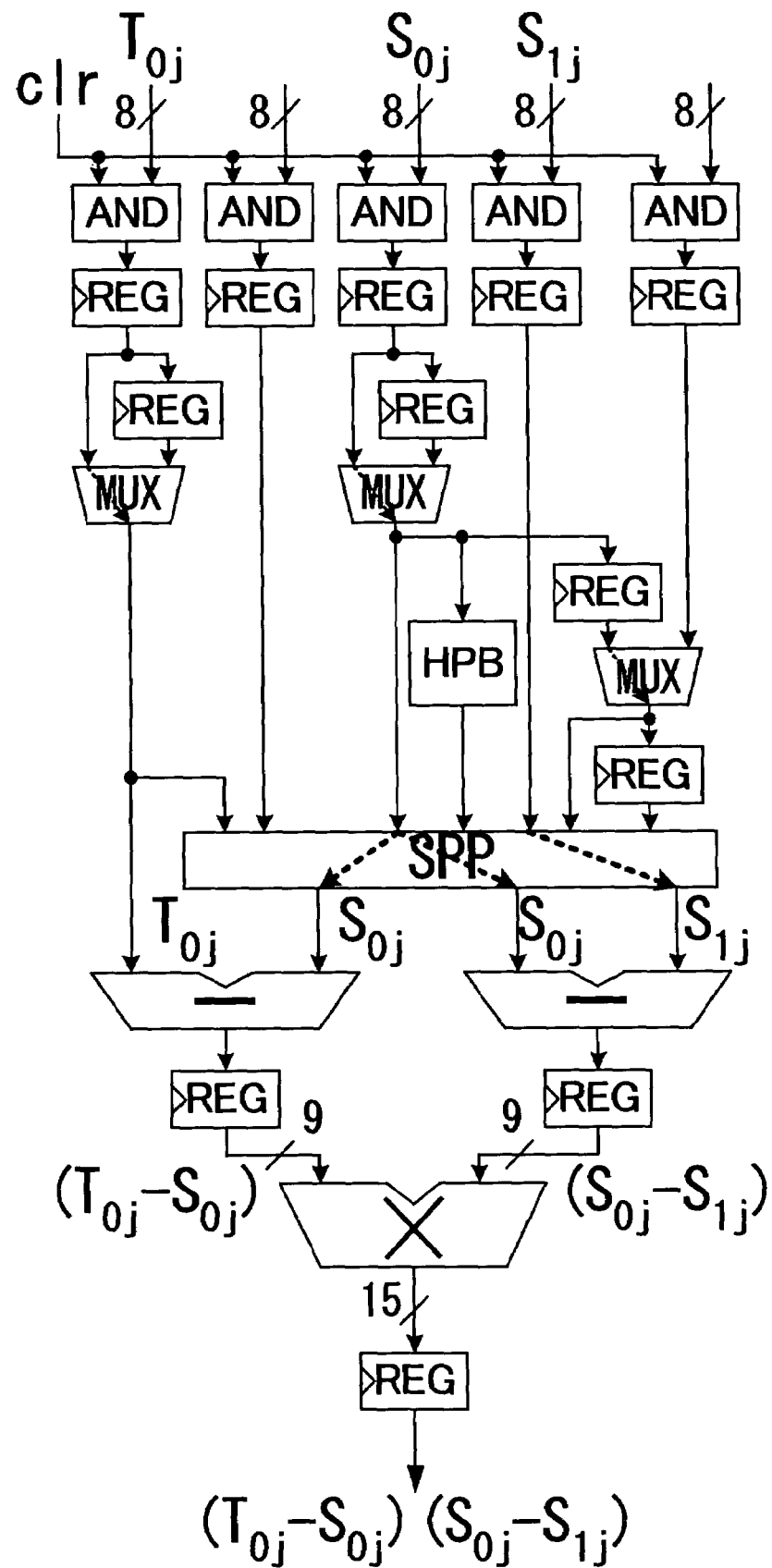
FIG. 18 is a diagram of the processing element when x differential coefficient (left) is calculated.
Figure 19:
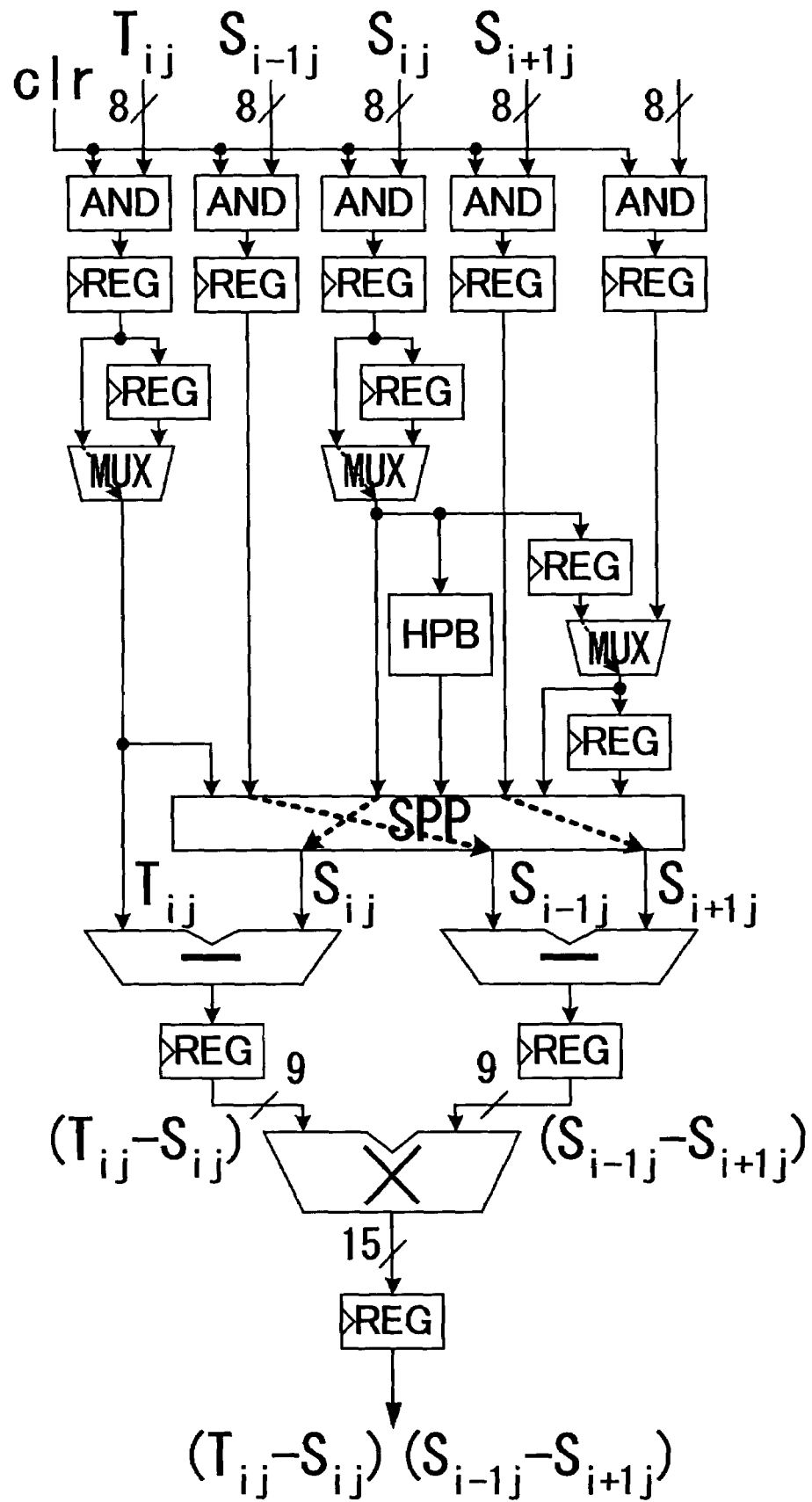
FIG. 19 is a diagram of the processing element when x differential coefficient (at positions other than left and right ends) is calculated.
Figure 20:
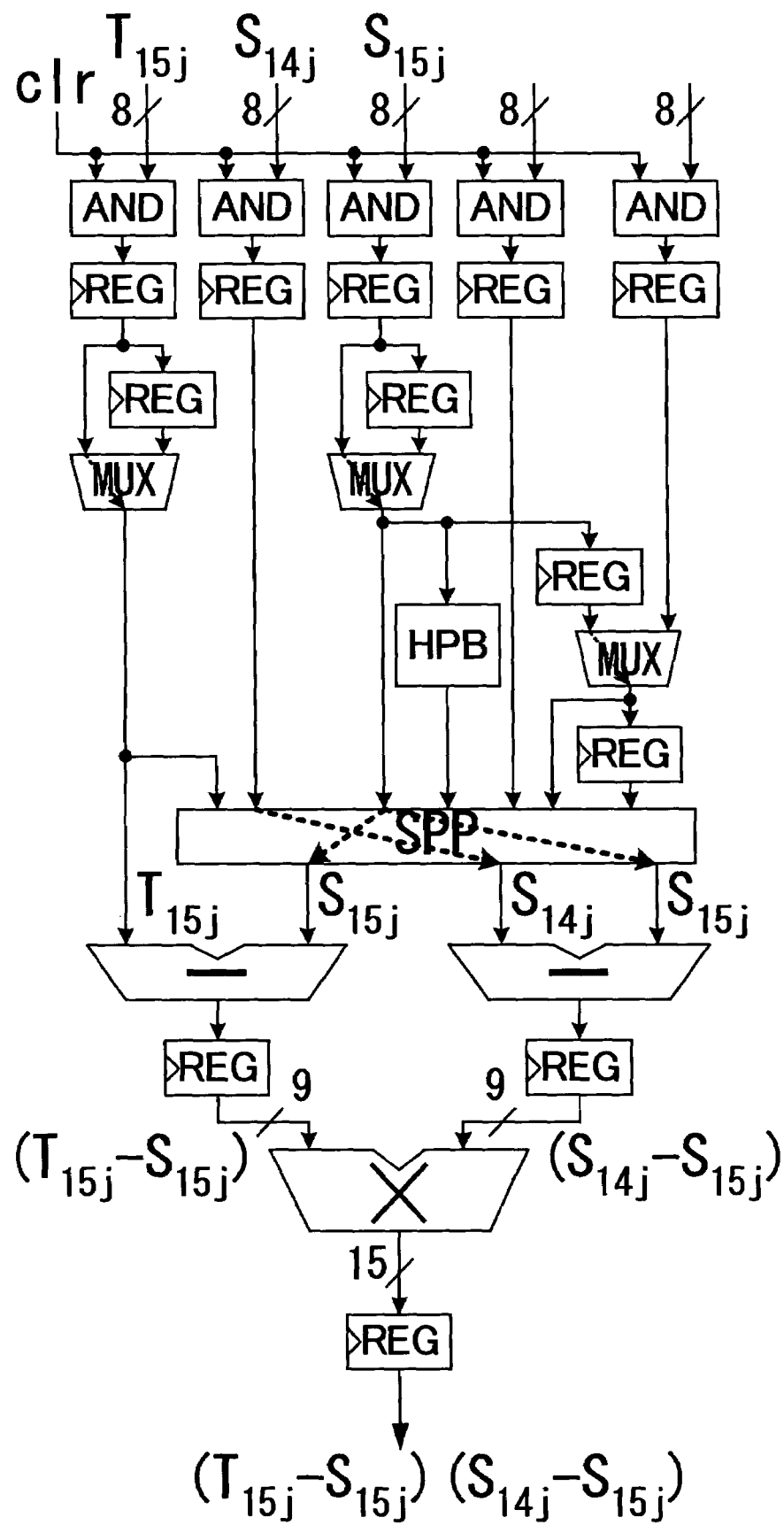
FIG. 20 is a diagram of the processing element when x differential coefficient (right end) is calculated.

FIG. 18 shows a state in the processing element (PE) when $(TB_{0,j}-SW_{0,j})(SW_{0,j}-SW_{1,j})$ is calculated in the calculation of x differential coefficient (left end: i=0). FIG. 19 shows a state in the processing element when $(TB_{i,j}-SW_{i,j})(SW_{i-1,j}-SW_{i+1,j})$ is calculated in the calculation of x differential coefficient (at positions other than the left and right ends). FIG. 20 shows a state in the processing element when $(TB_{15,j}-SW_{15,j})(SW_{14,j}-SW_{15,j})$ is calculated in the calculation of x differential coefficient (right end: i=15). Pixels necessary for the calculation of differential coefficients are the pixels in the macroblock and additional pixels having the distance of one pixel from the macroblock, but it is to be noted here that the additional pixels are substituted by pixels at the end of the macroblock.

Figure 21:
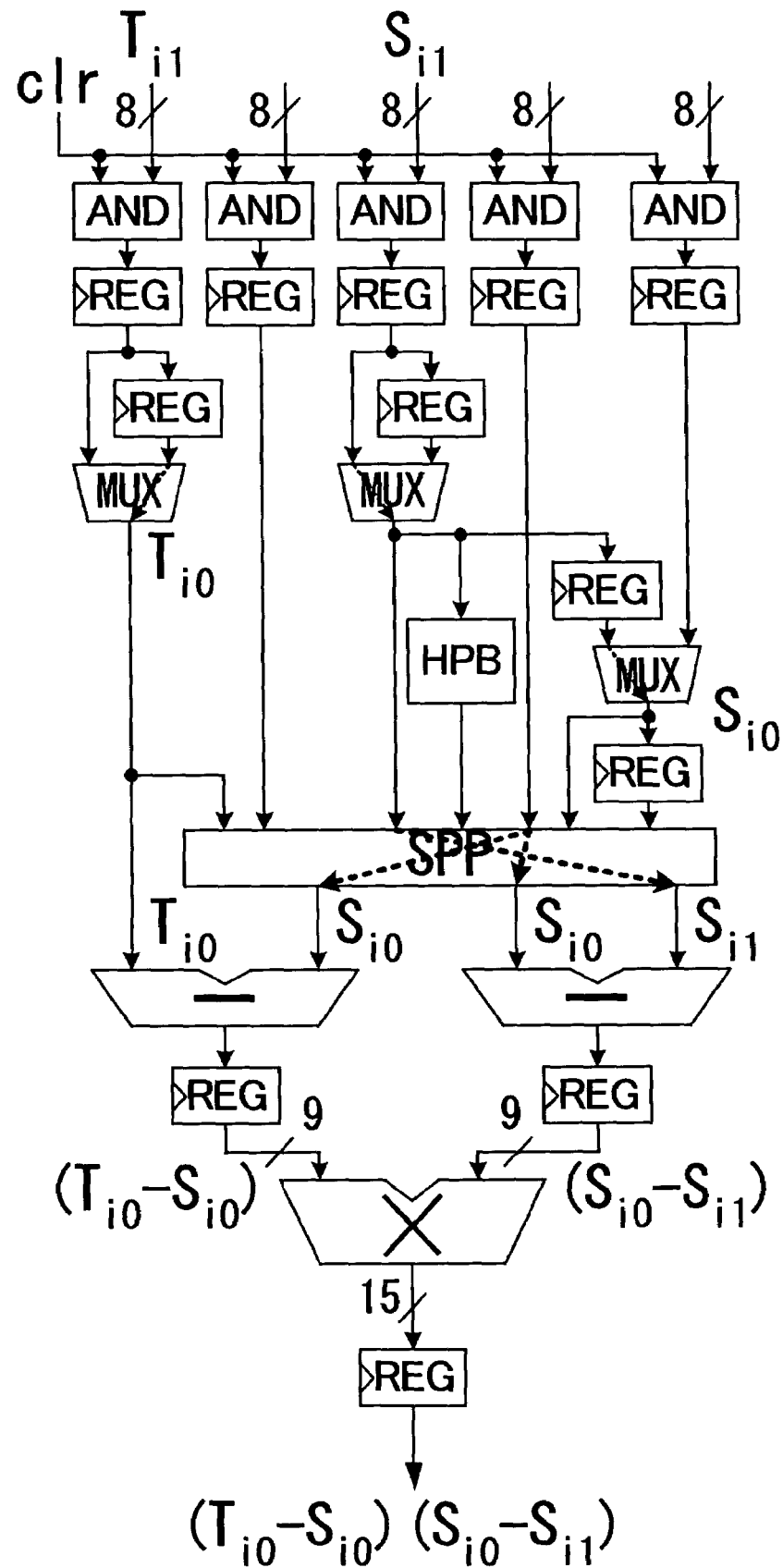
FIG. 21 is a diagram of the processing element when y differential coefficient (first layer) is calculated.
Figure 22:
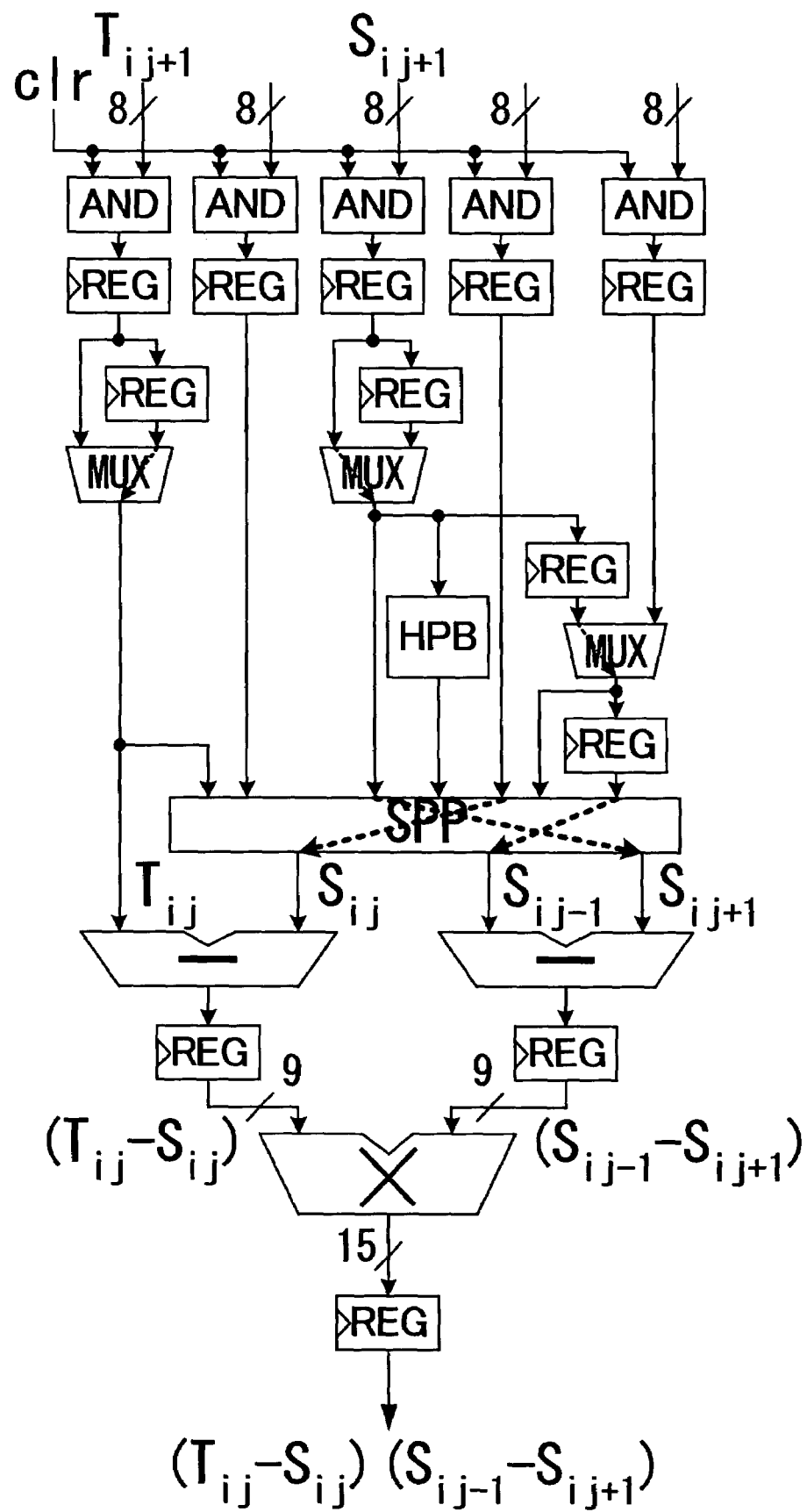
FIG. 22 is another diagram of the processing element when y differential coefficient (first layer) is calculated.
Figure 23:
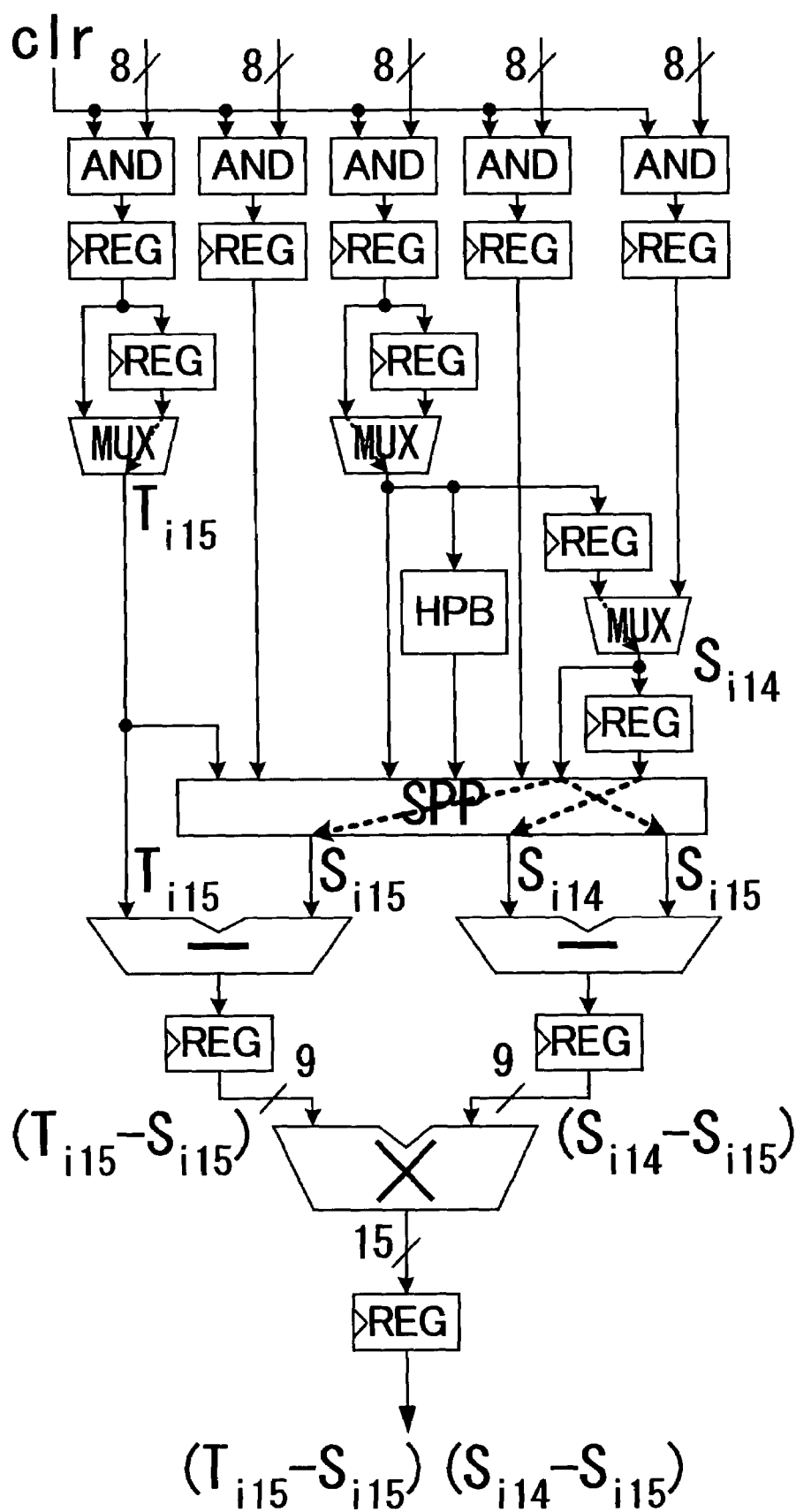
FIG. 23 is a further diagram of the processing element when y differential coefficient (first layer) is calculated.

FIG. 21 shows a state in the processing element (PE) when $(TB_{i,0}-SW_{i,0})(SW_{i,0}-SW_{i,1})$ is calculated for y differential coefficient (first layer, top end: y=0). FIG. 22 shows a state in the processing element when $(TB_{i,j}-SW_{i,j})(SW_{i,j}-SW_{i,j+1})$ is calculated for x differential coefficient (first layer, at positions other than the top and bottom ends). FIG. 23 shows a state in the processing element when $(TB_{i,15}-SW_{i,15})(SW_{i,14}-SW_{i,15})$ is calculated for x differential coefficient (first layer, bottom end: y=15).

Figure 24:
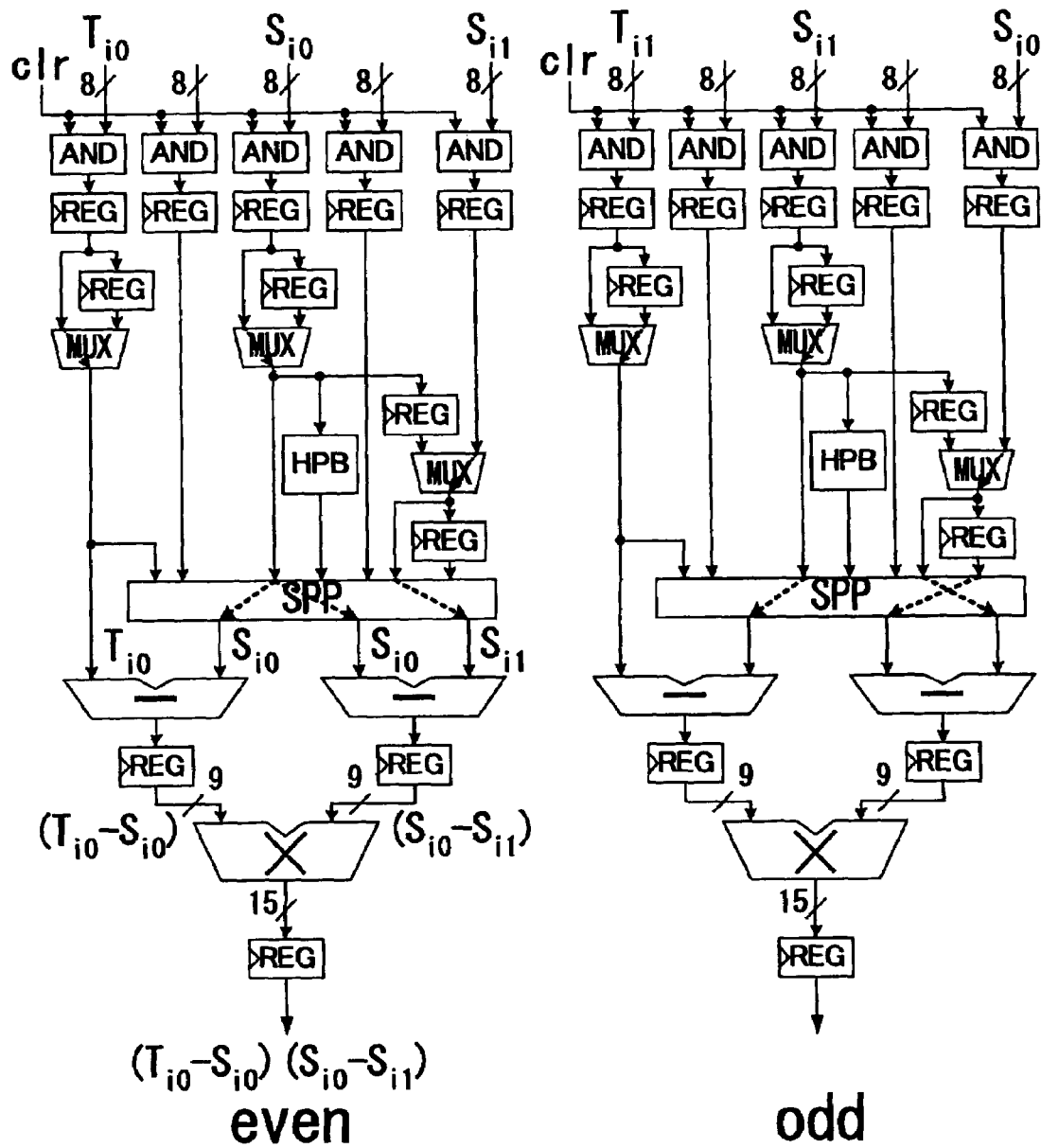
FIG. 24 is a diagram of the processing element when y differential coefficient (second or third layer) is calculated.
Figure 25:
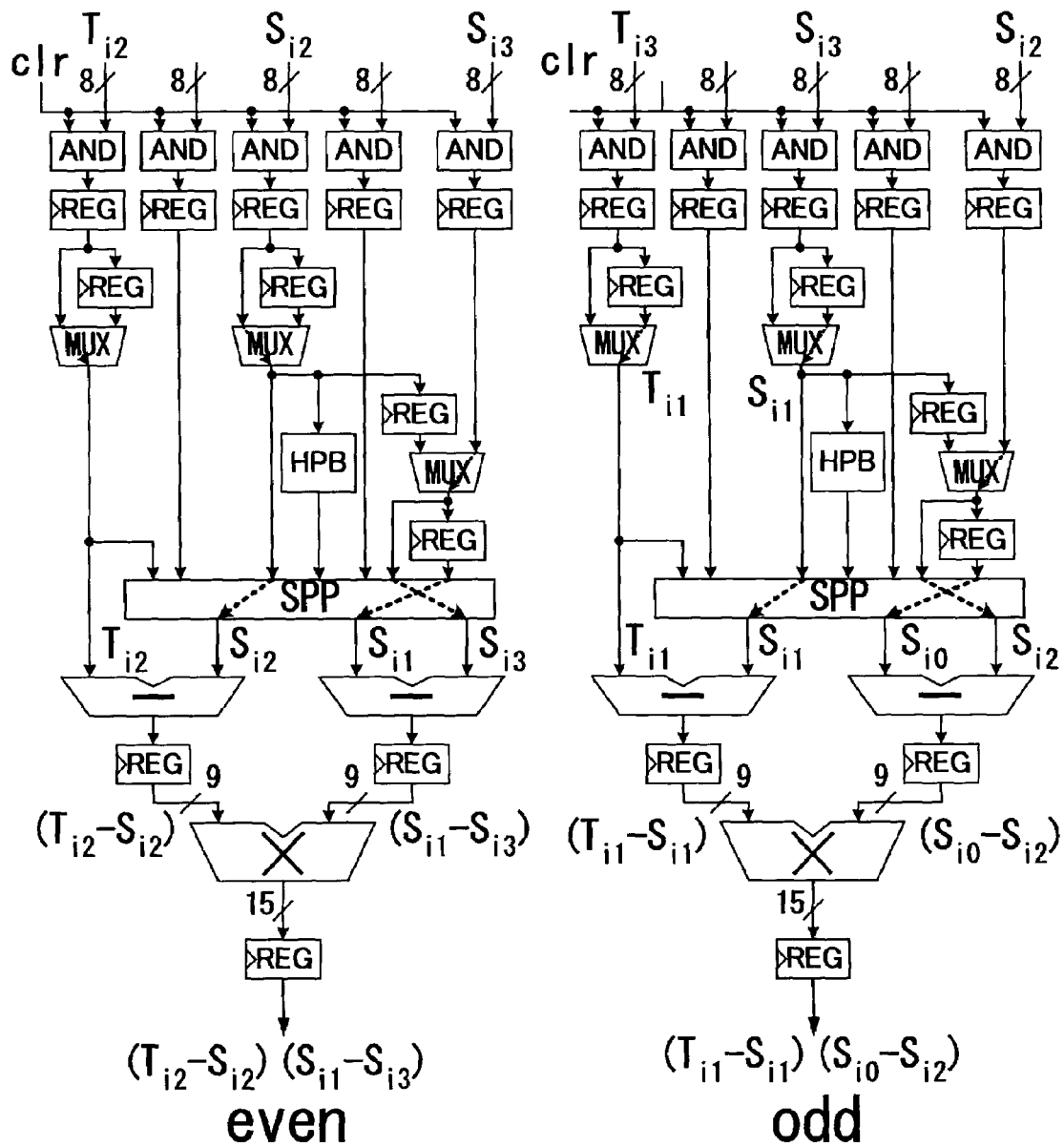
FIG. 25 is another diagram of the processing element when y differential coefficient (second or third layer) is calculated.
Figure 26:
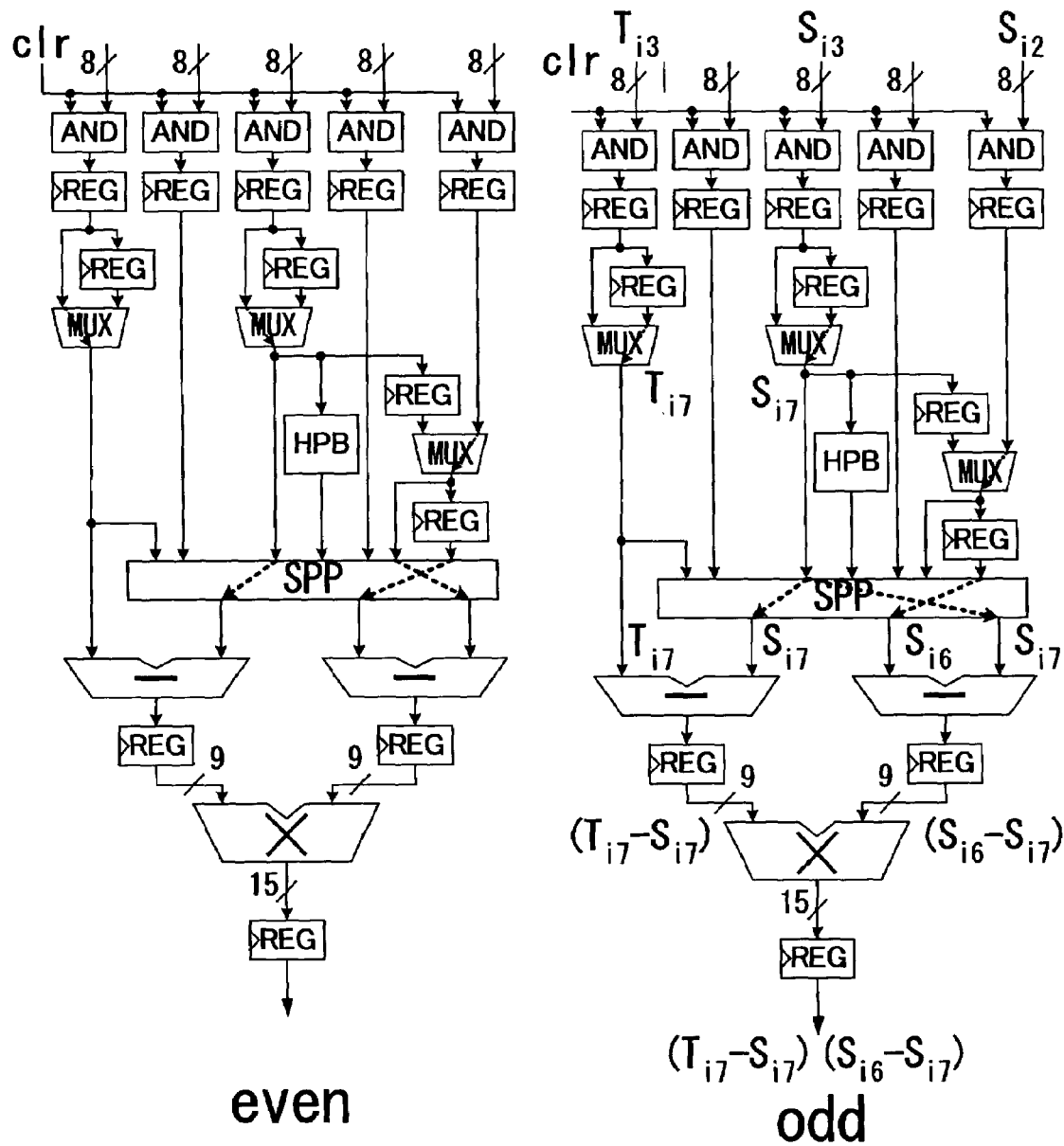
FIG. 26 is a further diagram of the processing element when y differential coefficient (second or third layer) is calculated.

FIG. 24 shows a state in the processing element (PE) when $(TB_{i,0}-SW_{i,0})(SW_{i,0}-SW_{i,1})$ is calculated for y differential coefficient (two lines read [second or third layer]/cycle 1) for even lines. FIG. 25 shows a state in the processing element when $(TB_{i2,i4,i6}-SW_{i1,i3,7})(SW_{i1,i3,i5}-SW_{i3,i5,i7})$ for even lines and $(TB_{i1,i3,i5}-SW_{i1,i3,7})(SW_{i0,i2,i4}-SW_{i2,i4,i6})$ for odd lines are calculated for x differential coefficient (two lines read [second or third layer]/cycle 2 or 4). FIG. 26 shows a state in the processing element when $(TB_{i7}-SW_{i7})(SW_{i6}-SW_{i7})$ is calculated for x differential coefficient (two lines read [second or third layer]/cycle 5) for odd lines.

Figure 27:
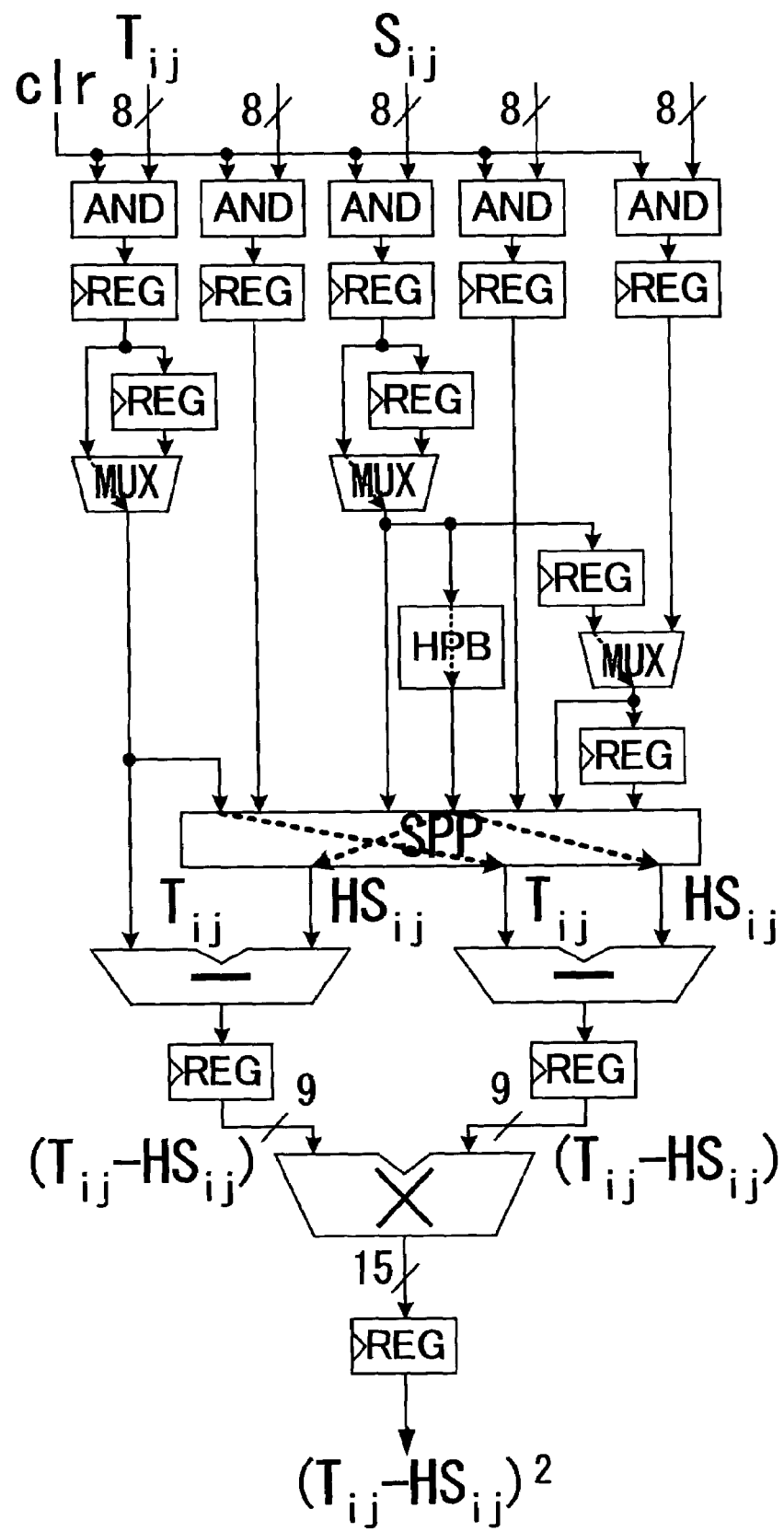
FIG. 27 is a diagram of the processing element when final adjustment is calculated.
Figure 28:
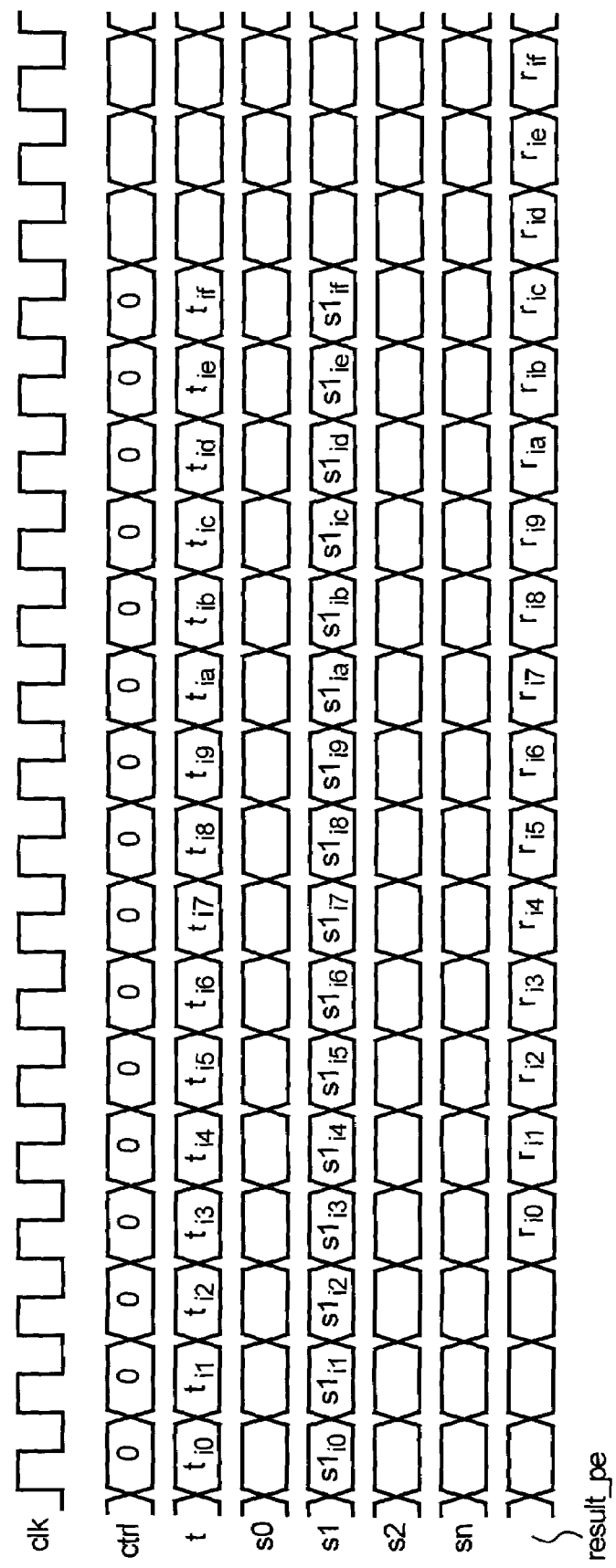
FIG. 28 is a timing chart when an evaluation value is calculated.
Figure 29:
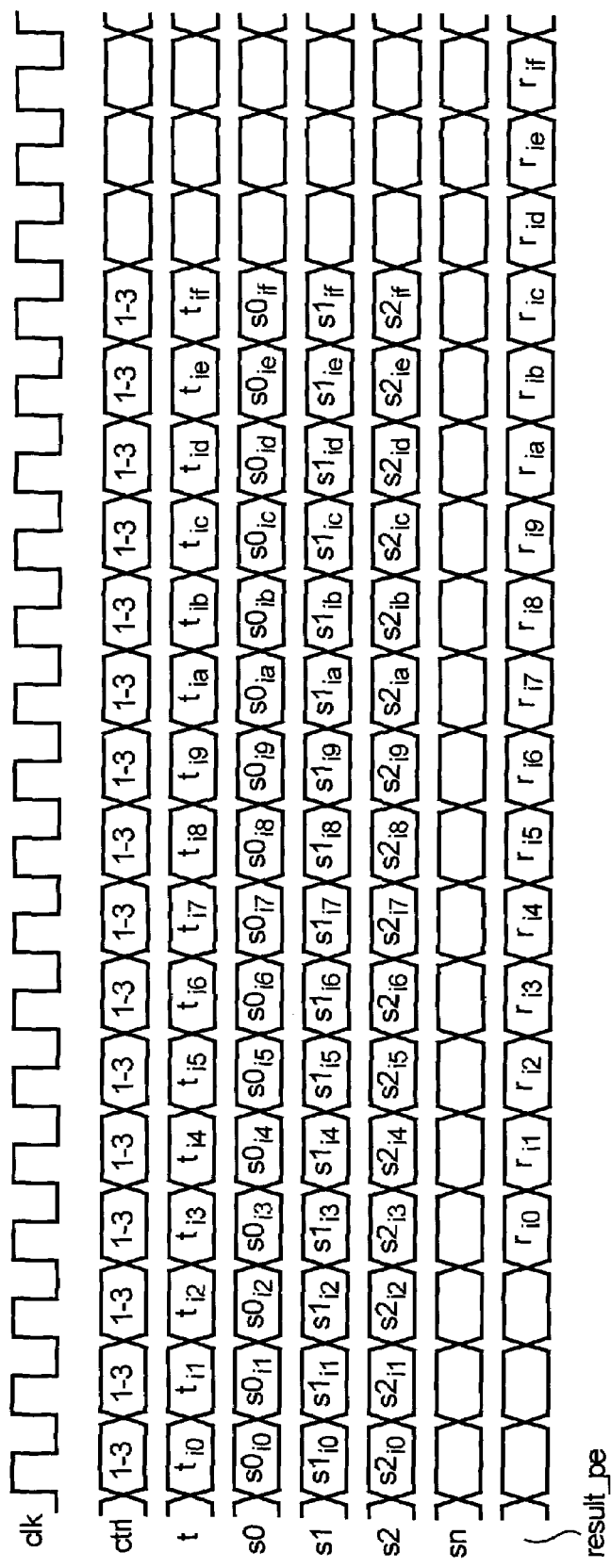
FIG. 29 is a timing chart when x differential coefficient is calculated.
Figure 30:
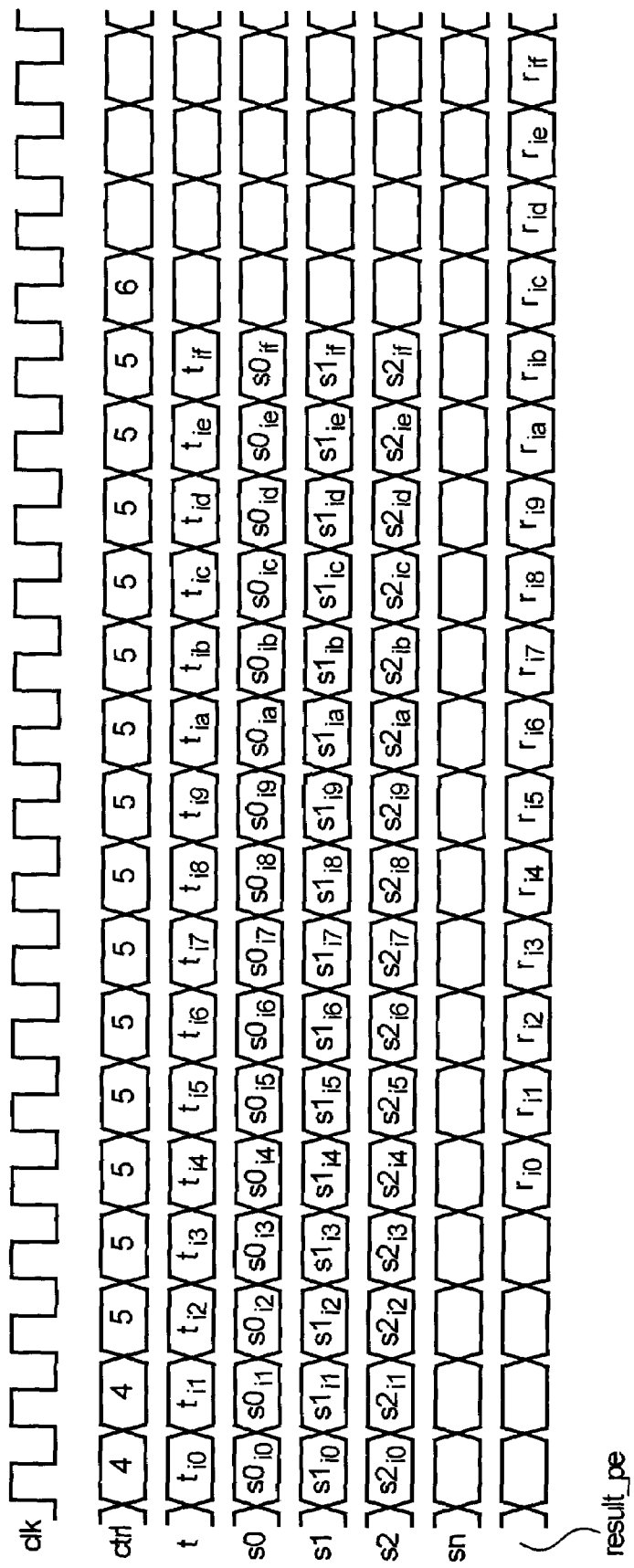
FIG. 30 is a timing chart when y differential coefficient is calculated in first layer.
Figure 31:
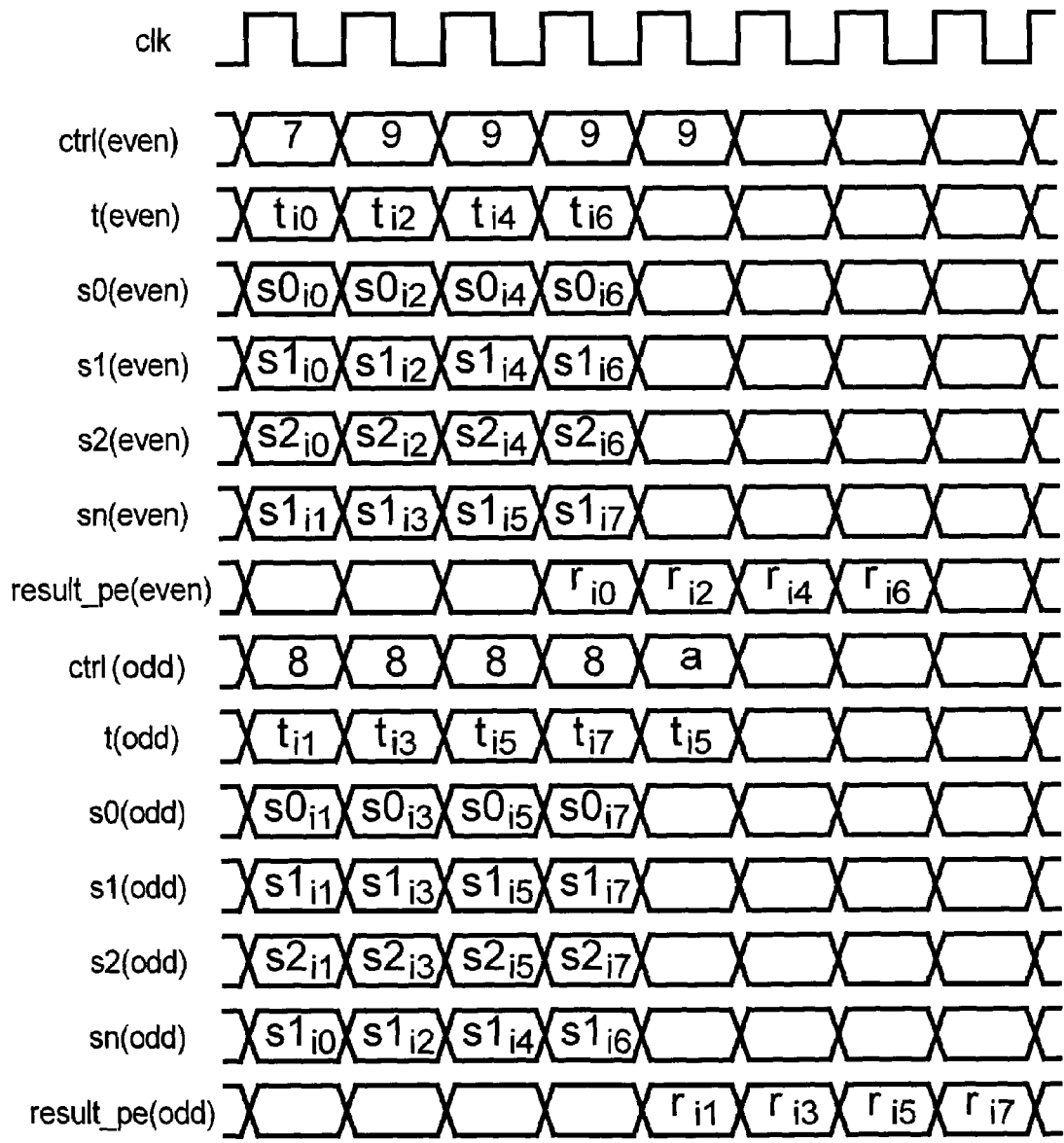
FIG. 31 is a timing chart when y differential coefficient is calculated in second and third layers.
Figure 32:
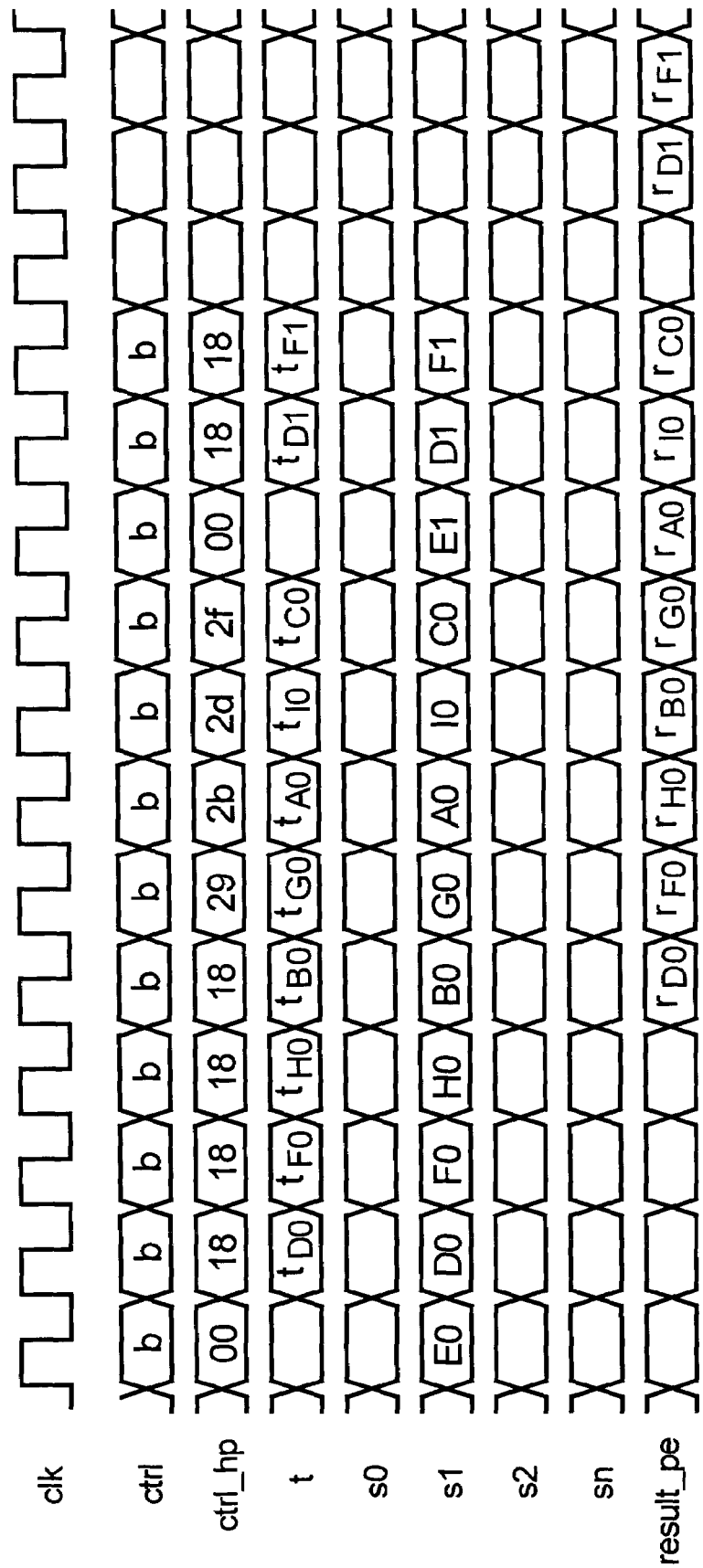
FIG. 32 is a timing chart on final adjustment.

FIG. 27 shows a state in the processing element (PE) when $(TB_{i,j}-SW_{i,j})^2$ is calculated for the final adjustment, wherein signal HS obtained by the half-pel blender (HPB) is used.

Further, FIGS. 28-32 show timing charts on the calculations of evaluated value, x differential coefficient, y differential coefficient at the first layer, y differential coefficient at the second or third layer and final adjustment, respectively.

Figure 33:
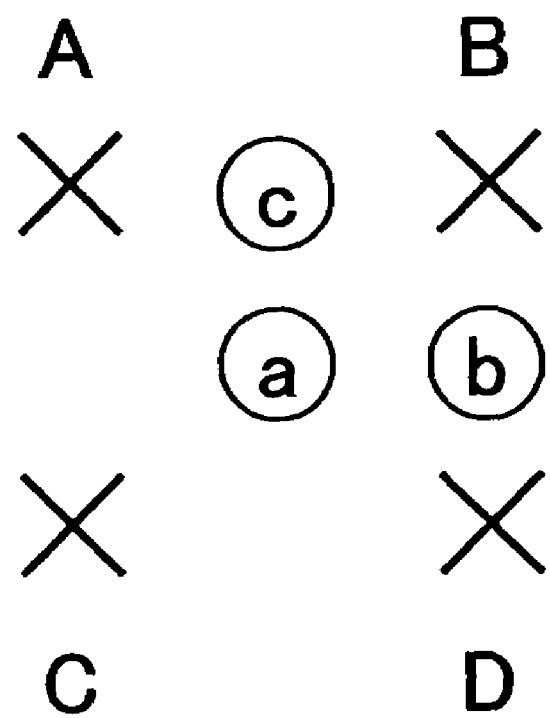
FIG. 33 is a diagram for explaining generation of a half-pel schematically.

The half-pel blender (HPB) outputs data of a half-pel. Search in the precision of half-pel is possible by using the half-pel blender. A half-pel is generated as shown schematically in FIG. 33, wherein X denotes a position of full-pel, O denotes a position of full-pel, "A", "B", "C", "D", "E", "F", "G", "H" and "I" denote pixel data of full-pels at corresponding positions, and "a", "b", "c", "d", "e", "f", "g", "h" and "i" denote pixel data at corresponding positions. For example, the pixel data of "a", "b" and "c" are calculated as follows.

$a=(A+B+C+D)/4,$ $b=(B+D)/2,$ and $c=(A+B)/2.$

The pixel data of "d" to "i" are calculated similarly.

Table 13 shows input/output signals of a half-pel blender (HPB).

TABLE 13

Input/output signals of a half-pel blender

| Pin name | Direction | Explanation |
| --- | --- | --- |
| clk | Input | Clock |
| ctrl_hp[5:0] | Input | Designation of destination from input to output |
| swl_reg[7:0] | Input | Input data |
| hpb_out[7:0] | Output | Output data |

Figure 34:
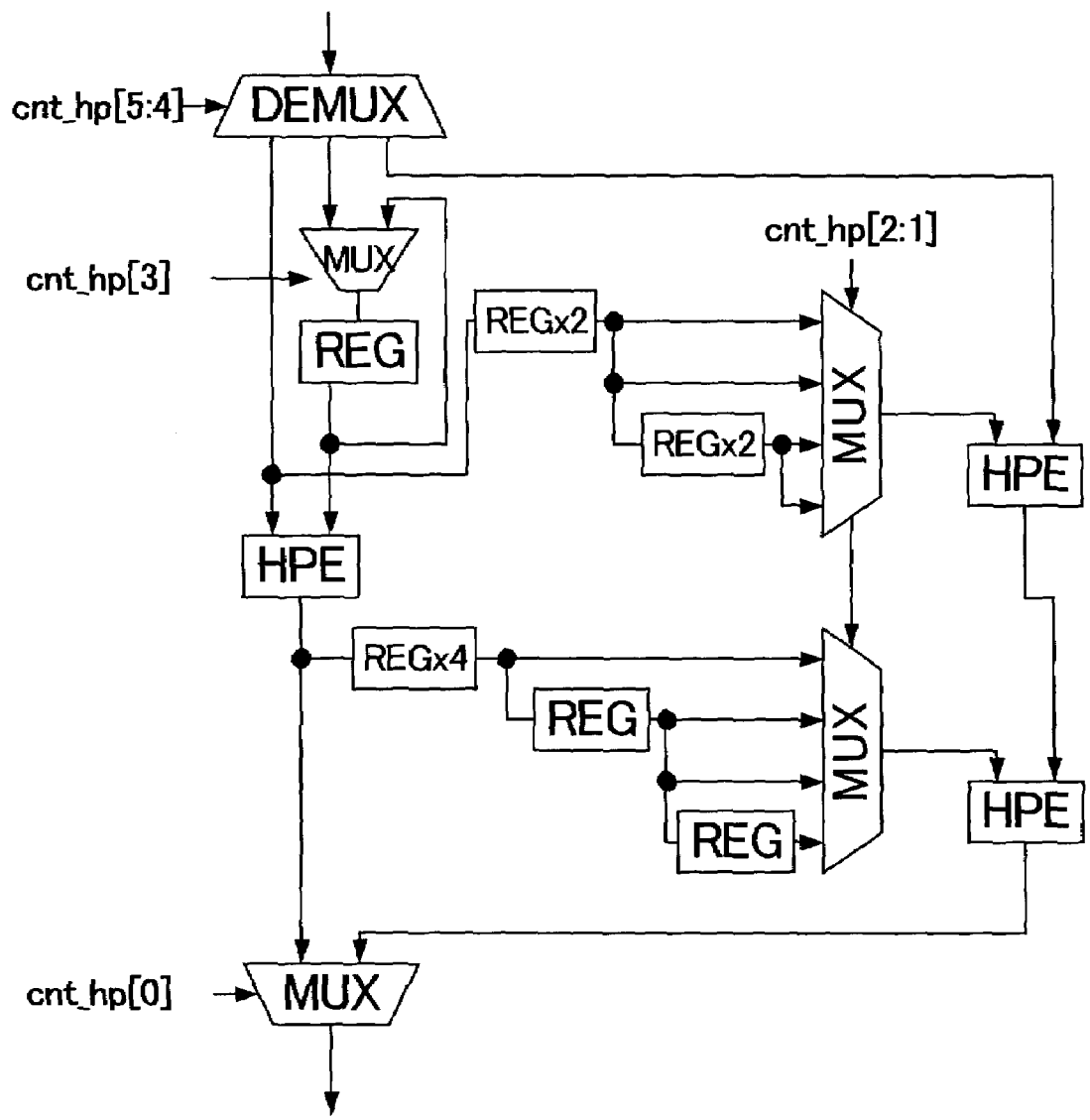
FIG. 34 is a block diagram of a half-pel blender.
Figure 35:
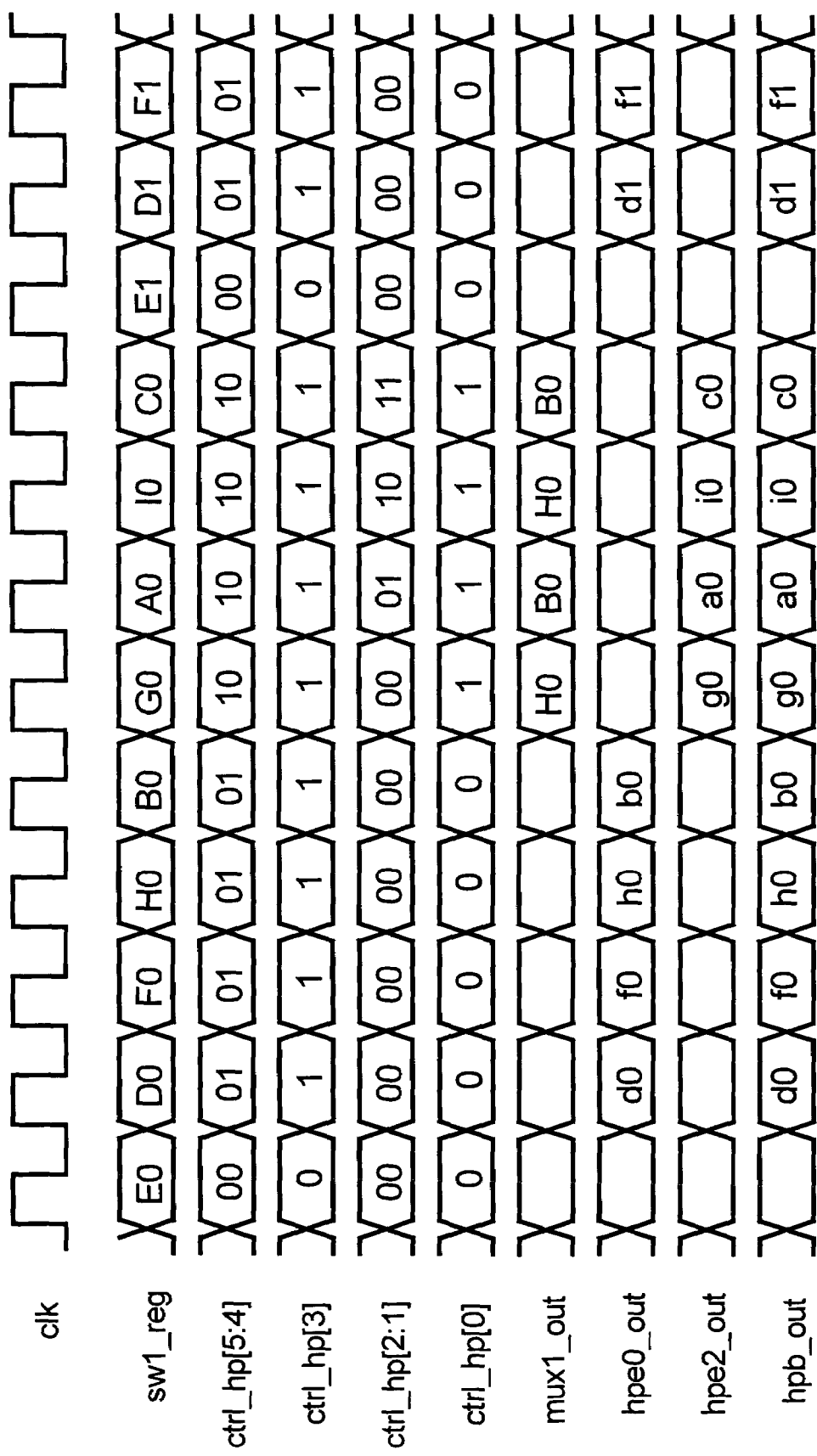
FIG. 35 is a timing chart of the half-pel blender.

FIG. 34 shows a structure of the half-pel blender. A half-pel value is generated based on the signals inputted to a demultiplexer (DEMUX) and is outputted from a multiplexer (MUX). Detailed explanation is omitted here. FIG. 35 shows a timing chart of the half-pel blender. Eight half-pel data "a" to "i" are outputted successively based on the control signal swl_reg.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An encoding method of moving pictures which generates a predictive picture for a current picture based on a reference picture and a motion vector, comprising the steps of:

dividing a macroblock into a plurality of subblocks smaller than the macroblock;

setting an initial value of the motion vector for the plurality of subblocks;

calculating in each of the plurality of subblocks an evaluated value E on a difference between the current picture and the reference picture, $$E = \sum_{i,j} (TB_{i,j} - SW_{i+Vx, j+Vy})^2,$$

wherein $TB_{i,j}$ represents pixel value at pixel position (i, j) in a template block of the current picture, $SW_{i,j}$ represents pixel value at pixel position (i, j) in a search window of the predictive picture, and $V_x$ and $V_y$ represent the motion vector in x and y directions, and differential coefficients thereof in x and y directions, $\partial E/\partial x$ and $\partial E/\partial y;$ evaluating in each of the plurality of subblocks the value E at a plurality of pixel positions in a direction having the steepest downward gradient derived from the differential coefficients to determine the minimum evaluated value;

expanding each of the plurality of subblocks to a macroblock by supplementing defective portions; and selecting the smallest value among the minimum evaluated values obtained on the plurality of subblocks to determine the motion vector based on the pixel position of the smallest value.

2. The method according to claim 1, further comprising the steps of calculating for the macroblock the value E and the differential coefficients thereof, and evaluating the value E in a direction derived from the differential coefficients at a plurality of pixel positions to determine a motion vector based on the smallest value, and setting the determined vector as the initial value of the motion vector for the subblocks.

3. The method according to claim 1, further comprising the steps of calculating for the macroblock the value E and the differential coefficients thereof, and evaluating the value E in a direction shown by the differential coefficients at a plurality of pixel positions, determining a motion vector having the minimum value, and selecting the smallest value among the minimum evaluated values obtained on the plurality of subblocks and on the macroblock to determine the motion vector based on the pixel position of the smallest value.

4. The method according to claim 1, wherein in the steps of calculation and evaluation, the value E and the differential coefficients thereof are calculated in n hierarchical layers wherein n is a natural number, wherein a picture of (m+1)-th hierarchical layer is generated with ¼ sampling of a picture of the m-th hierarchical layer.

5. The method according to claim 1, wherein in the step of evaluation, when the macroblock or the subblocks extend over a top, bottom, left or right boundary of the reference picture, the pixel position is moved continuously by supplementing pixels existing at an boundary opposite to the boundary with pixels in an overrunning portion.

6. An encoding apparatus for moving pictures which generates a predictive picture on a current picture based on a reference picture and a motion vector, comprising;
   a template block memory storing data of a template block having a size of a macroblock;
   a search window memory storing data of a search window;
   an address generator which generates an address of a search point or a pixel in a search range and outputs the address to the template block memory and to the search window memory;
   a calculator comprising sixteen processing elements and an adder, wherein each of said sixteen processing element receives pixel data in said template block memory and in said search window memory, calculates differences $(TB_{i,j} - SW_{i+Vx,j+Vy})$ and $(SW_{i+1+Vx,j+Vy} - SW_{i-1+Vx,j+Vy})$ or $(SW_{i+1+Vx,j+Vy} - SW_{i-1+Vx,j+Vy})$ $(SW_{i+Vx,j+1+Vy} - SW_{i+Vx,j-1+Vy})$ wherein $TB_{i,j}$ represents pixel value at a pixel position (i, j) in a template block of the current picture, $SW_{i,j}$ represents pixel value at a pixel position (i, j) in a search window of the predictive picture, and $V_x$ and $V_y$ represent vector values in x and y directions, and a difference of pixel values at a position $(i+V_x, j+V_y)$ in x direction, a difference of pixel values at a position $(i+V_x, j+V_y)$ in y direction, and products thereof, on a line in a search range, and said adder sums results of the calculation of the processing elements for each line in the search range to determine an evaluated value E, $$E = \sum_{i,j}(TB_{i,j} - SW_{i+Vx,j+Vy})^2,$$

and differential coefficients thereof, $$\frac{\partial E}{\partial x} = \sum_i \sum_j (TB_{i,j} - SW_{i+Vx,j+Vy})(SW_{i+1+Vx,j+Vy} - SW_{i-1+Vx,j+Vy})$$

and $$\frac{\partial E}{\partial y} = \sum_i \sum_j (TB_{i,j} - SW_{i+Vx,j+Vy})(SW_{i+Vx,j+1+Vy} - SW_{i+Vx,j-1+Vy}),$$

a vector generator which generates a motion vector based on the data of the differential coefficients received from said calculator; and
   a sequencer which sets said calculator to calculate the value E or the differential coefficients, controls said address generator to repeat the calculation by said calculator in a search range on a subblock smaller than a macroblock, makes said adder add results of the calculation to output the evaluated value or the differential coefficient thereof.

7. The apparatus according to claim 6, wherein said processing element comprises:
   a plurality of registers which stores pixel data from said template block memory, pixel data from said search window memory, and pixel data of neighboring pixels from said search window memory ;
   first and second subtractors which calculate a difference between input values of plus and minus input terminals;
   a connector including a delay circuit which delays a signal in a direction perpendicular to a line and which sends pixel data stored in said plurality of registers and pixel data delayed by said delay circuit to the plus and minus input terminals of said subtractor according to a control signal from said sequencer; and
   a multiplier which multiplies data received from said first and second subtractors.

8. The apparatus according to claim 7, wherein said plurality of registers include a first register which registers pixel data of a first pixel from the template block memory, a second register which registers pixel data of another pixel left of the first pixel from the search window memory, a third register which stores pixel data of the first pixel from the search window memory, a fourth register which registers pixel data of a further pixel left of the first pixel from the search window memory, and a fifth register which registers pixel data of the pixel left or right of the first pixel from the search window memory.

9. The apparatus according to claim 6, wherein said processing element further comprises a half-pel blender which generates data in precision of half-pel based on pixel data from the search window memory.

* * * * *